(12) United States Patent
Li et al.

(10) Patent No.: US 12,705,460 B2
(45) Date of Patent: Aug. 11, 2026

(54) SYSTEMS AND METHODS FOR PERCEPTUAL QUALITY-DRIVEN ADAPTIVE QUANTIZATION IN NEURAL NETWORK DATA COMPRESSION WITH DYNAMIC FEEDBACK CONTROL

(71) Applicant: AtomBeam Technologies Inc., Moraga, CA (US)

(72) Inventors: Zhu Li, Overland Park, KS (US); Paras Maharjan, Kansas City, MO (US); Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/048,895

(22) Filed: Feb. 8, 2025

(65) Prior Publication Data

US 2025/0190765 A1 Jun. 12, 2025

Related U.S. Application Data

(63) Continuation-in-part of application No. 18/907,442, filed on Oct. 4, 2024, now Pat. No. 12,224,777, which (Continued)

(51) Int. Cl.
*G06N 3/0455* (2023.01)
*G06F 17/14* (2006.01)

(52) U.S. Cl.
CPC ......... *G06N 3/0455* (2023.01); *G06F 17/147* (2013.01)

(58) Field of Classification Search
CPC .. G06N 3/0455; G06F 17/147; H03M 7/3059; H03M 7/3068; H03M 7/6041
See application file for complete search history.

(56) References Cited

U.S. PATENT DOCUMENTS 7,629,922 B2 12/2009 Winstead et al.
7,876,257 B2 1/2011 Vetro et al.

(Continued)

OTHER PUBLICATIONS

Mishra D, Singh SK, Singh RK. Deep cnn based image compression with redundancy minimization via attention guidance. Neurocomputing. Oct. 1, 2022;507:397-411. (Year: 2022).*

(Continued)

*Primary Examiner* — Oluwatosin Alabi
(74) *Attorney, Agent, or Firm* — GALVIN PATENT LAW LLC; Brian R. Galvin; Erin L. Johnson

(57) ABSTRACT

A system for adaptive data compression uses content-aware analysis and dynamic feedback to optimize compression quality. An adaptive quantization subsystem analyzes content characteristics of input data and determines appropriate quantization parameters. A bit allocation engine distributes available bits across different portions of the input data based on the analyzed characteristics. A quality assessment subsystem monitors the compressed output and generates parameter adjustment signals based on measured quality metrics. A feedback control subsystem then modifies the quantization parameters in response to these signals. The modified parameters are used to create optimized compressed output data from the input dataset. This dynamic, content-aware approach enables improved compression quality while maintaining efficient data reduction.

16 Claims, 13 Drawing Sheets

Related U.S. Application Data is a continuation-in-part of application No. 18/885,741, filed on Sep. 16, 2024, now Pat. No. 12,554,010, which is a continuation-in-part of application No. 18/792,542, filed on Aug. 1, 2024, now Pat. No. 12,392,891, said application No. 18/907,442 is a continuation-in-part of application No. 18/648,340, filed on Apr. 27, 2024, now Pat. No. 12,166,507, which is a continuation-in-part of application No. 18/427,716, filed on Jan. 30, 2024, now Pat. No. 12,093,972, which is a continuation-in-part of application No. 18/410,980, filed on Jan. 11, 2024, now Pat. No. 12,068,761, which is a continuation-in-part of application No. 18/537,728, filed on Dec. 12, 2023, now Pat. No. 12,058,333.

(56) References Cited

U.S. PATENT DOCUMENTS 10,091,507 B2* 10/2018 Lee ...................... H04N 19/176
10,499,069 B2 12/2019 Wang et al.
10,701,394 B1 6/2020 Caballero et al.
11,532,155 B1* 12/2022 Garimella ............... G06T 7/593
11,656,353 B2 5/2023 Li et al.
11,915,690 B1 2/2024 Chang et al.
2014/0022099 A1 1/2014 Fallon et al.
2015/0043815 A1* 2/2015 Tan ...................... H04N 19/154 382/166
2016/0205399 A1* 7/2016 Walls ................... H04N 19/186 375/240.02
2018/0018990 A1 1/2018 Kim et al.
2019/0034781 A1 1/2019 Asano et al.
2020/0404340 A1 12/2020 Xu et al.
2022/0086463 A1 3/2022 Coban et al.
2022/0246158 A1 8/2022 Nam et al.
2022/0270623 A1* 8/2022 Liang ....................... G06N 3/08
2022/0327692 A1* 10/2022 Park ...................... G06T 7/0012
2022/0385907 A1* 12/2022 Zhang .................... H04N 19/91
2022/0394240 A1* 12/2022 Zhang .................. H04N 19/105
2023/0154055 A1 5/2023 Besenbruch et al.
2023/0194731 A1 6/2023 Parkins
2023/0290134 A1* 9/2023 Hu ..................... G06V 10/7715
2023/0336784 A1* 10/2023 Esenlik ................ H04N 19/119
2023/0396801 A1* 12/2023 Racape ................ H04N 19/176
2024/0119575 A1* 4/2024 Bampis .................. G06N 20/10
2024/0242392 A1* 7/2024 Richarte ................ G06V 20/13
2024/0406424 A1* 12/2024 Kalva .................... H04N 19/42
2024/0430428 A1* 12/2024 Esenlik ................ H04N 19/124
2025/0217718 A1* 7/2025 Liang ................... H04B 7/0639
2025/0267296 A1* 8/2025 Crabtree .............. H04N 19/164
2026/0059128 A1* 2/2026 Racape .................. H04N 19/30

OTHER PUBLICATIONS

Ma S, Zhang X, Jia C, Zhao Z, Wang S, Wang S. Image and video compression with neural networks: A review. IEEE Transactions on Circuits and Systems for Video Technology. Apr. 17, 2019;30(6):1683-98. (Year: 2019).*

Hadar O, Birman R. Deep Learning in Video Compression Algorithms. InMulti-faceted Deep Learning: Models and Data Feb. 24, 2012 (pp. 175-198). Cham: Springer International Publishing. (Year: 2012).*

Cai, Yuanhao et al., "Mask-guided Spectral-wise Transformer for Efficient Hyperspectral Image Reconstruction", Conference on Computer Vision and Pattern Recognition, pp. 17502-17511, 2022.

Cai, Yuanhao; et al., "MST++: Multi-stage Spectral-wise Transformer for Efficient Spectral Reconstruction", Conference on Computer Vision and Pattern Recognition, 2022.

He, Kaiming; Zhang, Xiangyu; Ren, Shaoqing; Sun, Jian; Microsoft Research, "Deep Residual Learning for Image Recognition", Conference on Computer Vision and Pattern Recognition, pp. 770-778, 2016.

* cited by examiner

SYSTEMS AND METHODS FOR PERCEPTUAL QUALITY-DRIVEN ADAPTIVE QUANTIZATION IN NEURAL NETWORK DATA COMPRESSION WITH DYNAMIC FEEDBACK CONTROL

CROSS-REFERENCE TO RELATED APPLICATIONS

Priority is claimed in the application data sheet to the following patents or patent applications, each of which is expressly incorporated herein by reference in its entirety:

Ser. No. 18/907,442
Ser. No. 18/885,741
Ser. No. 18/792,542
Ser. No. 18/648,340
Ser. No. 18/427,716
Ser. No. 18/410,980
Ser. No. 18/537,728

BACKGROUND OF THE INVENTION

Field of the Art

The present invention is in the field of data processing, and more particularly is directed to the field of data compression.

Discussion of the State of the Art

Data compression is a fundamental technology in computer applications that plays a critical role in enhancing performance, efficiency, and user experience. Data compression involves reducing the size of data files or streams without significantly compromising their quality, which leads to numerous benefits across various domains. Since compressed data requires less storage space than uncompressed data, it allows more data to be stored on the same device or server. Additionally, data compression can reduce costs associated with storage infrastructure, especially in large-scale data centers, as well as help to optimize the use of limited storage resources on mobile devices and IoT devices and sensors.

Data compression also provides advantages regarding network utilization, as smaller file sizes can result in shorter upload and download times over networks. Thus, data compression can improve website load times and responsiveness by reducing the size of web pages, images, and videos. Moreover, data compression can enhance streaming quality and reduce buffering during use of online media services. Additionally, data compression leads to cost reductions in storage, bandwidth, and hardware, by reducing the need for purchasing additional storage hardware, and reducing operational costs for maintaining large-scale storage systems and data centers.

However, existing compression systems often employ fixed quantization schemes that fail to adapt to varying content characteristics and changing network conditions. These static approaches can result in suboptimal compression quality, particularly when processing diverse content types or operating under fluctuating bandwidth constraints. Current systems may unnecessarily degrade quality in perceptually important regions while inefficiently allocating bits to less significant areas. This challenge becomes particularly acute in applications such as real-time streaming, medical imaging, and scientific data processing, where both compression efficiency and output quality are critical.

What is needed is an adaptive compression system that can dynamically optimize quantization parameters based on content characteristics and quality metrics, while maintaining efficient compression ratios across varying operating conditions and content types.

SUMMARY OF THE INVENTION

Accordingly, the inventor has conceived and reduced to practice a system and method for adaptive data compression utilizing content-aware analysis and dynamic quality feedback control.

According to a preferred embodiment, there is provided a system and method for data compression, wherein content characteristics of an input dataset are analyzed to determine quantization parameters, available bits are distributed across portions of the input dataset based on these characteristics, quality metrics are collected from compressed output data to generate parameter adjustment signals, and the quantization parameters are modified based on these signals to create optimized compressed output data.

According to an aspect of an embodiment, perceptual feature information is extracted from the input dataset using a content analyzer within the adaptive quantization subsystem.

According to an aspect of an embodiment, the bit distribution utilizes a rate-distortion optimization function.

According to an aspect of an embodiment, perceptual quality metrics are used to evaluate the compressed output data.

According to an aspect of an embodiment, a quality history database is maintained for parameter adjustment decisions.

According to an aspect of an embodiment, intermediate processing results are stored between the adaptive quantization subsystem and bit allocation engine.

According to an aspect of an embodiment, historical quantization parameters are maintained in a parameter storage subsystem.

According to an aspect of an embodiment, a perceptual quality score is calculated for the compressed output data.

According to another preferred embodiment, different quantization parameters are applied to different regions of the input dataset based on content complexity.

According to an aspect of an embodiment, compression ratio is monitored alongside perceptual quality metrics.

According to an aspect of an embodiment, bit allocation prioritizes regions of higher perceptual importance within the input dataset.

According to an aspect of an embodiment, gradual parameter adjustments are implemented to maintain stability.

According to an aspect of an embodiment, historical quality measurements are stored in a quality metrics database.

According to an aspect of an embodiment, a multi-scale analysis of the input dataset is performed for parameter determination.

BRIEF DESCRIPTION OF THE DRAWING FIGURES

Figure 1:
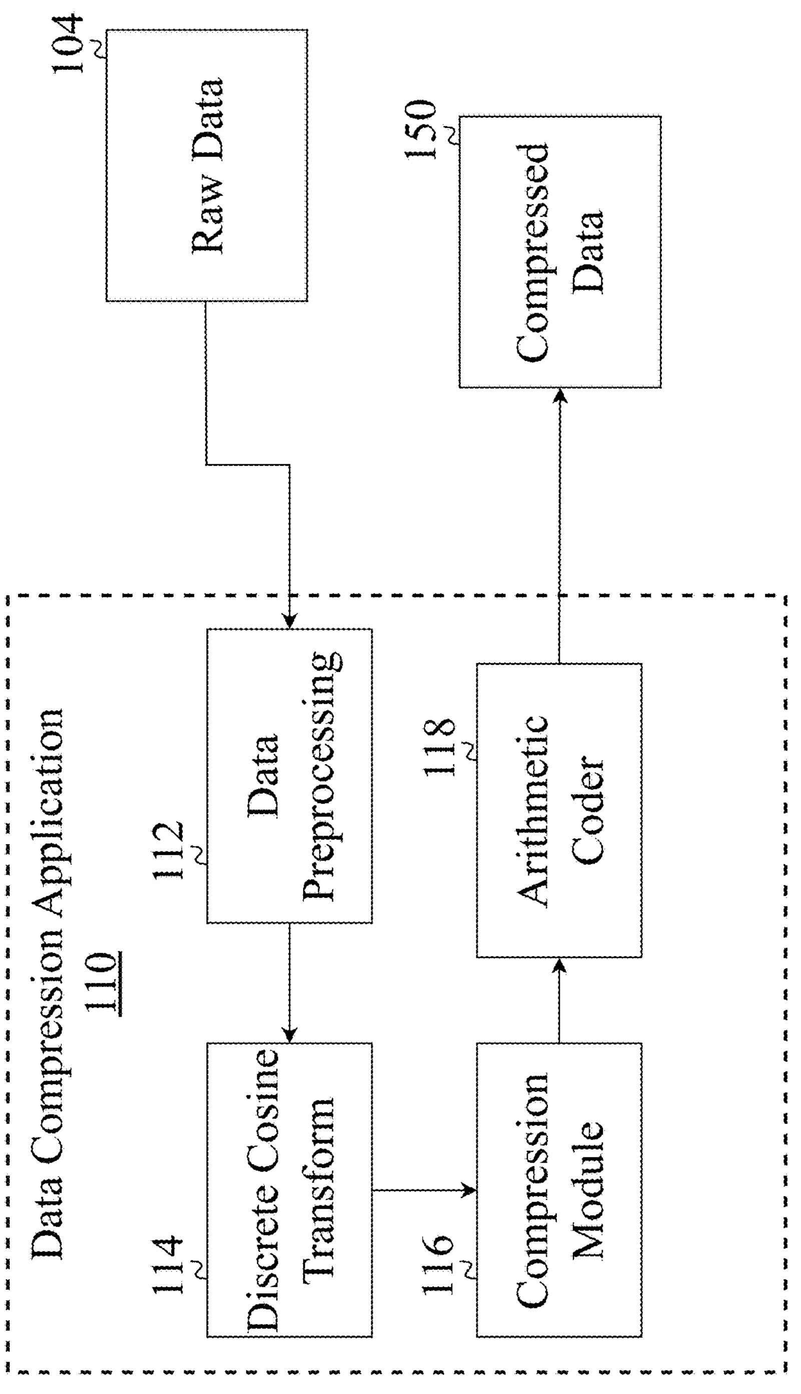
FIG. 1 is a block diagram illustrating an exemplary system architecture for compressing uncompressed data, according to an embodiment.

The drawings are not necessarily to scale. The drawings are merely schematic representations, not intended to portray specific parameters of the disclosed embodiments. The drawings are intended to depict only typical embodiments of the invention, and therefore should not be considered as limiting in scope.

DETAILED DESCRIPTION OF THE INVENTION

The inventor has conceived and reduced to practice a system and method for adaptive data compression utilizing content-aware analysis and dynamic quality feedback control. Traditional data compression systems often struggle to maintain optimal quality across varying types of content and operating conditions. Fixed quantization schemes can result in unnecessary quality degradation for perceptually important content while inefficiently allocating bits to less important regions. This challenge is particularly acute in applications such as real-time video streaming, medical imaging, or satellite communications, where both compression efficiency and output quality are critical. Moreover, changing network conditions and varying content complexity can make it difficult to maintain consistent quality with static compression parameters. Additionally, different types of content may have vastly different sensitivity to compression artifacts, making one-size-fits-all approaches suboptimal.

Disclosed embodiments enable intelligent data compression by utilizing adaptive quantization and dynamic feedback control to optimize compression parameters based on content characteristics and quality metrics. One or more embodiments provide content-aware analysis systems that can identify regions of perceptual importance and adjust compression parameters accordingly. Embodiments may include adaptive quantization subsystems, which can analyze input data characteristics and determine appropriate quantization parameters dynamically. A bit allocation engine may distribute available bits across different portions of input data based on analyzed content characteristics and complexity metrics. Quality assessment subsystems can monitor compressed output and generate adjustment signals based on measured quality metrics, enabling continuous optimization of compression parameters.

In an embodiment, content analysis may include extraction of perceptual feature information from input data. This analysis may utilize multiple techniques such as frequency analysis, texture analysis, or pattern recognition to identify regions of varying perceptual importance. Content analyzers may generate complexity metrics for different portions of input data, which can be used to guide bit allocation decisions. For example, regions with high detail or significant perceptual importance may receive higher bit allocation priority compared to regions with less detail or perceptual significance.

Bit allocation engines in disclosed embodiments may implement sophisticated distribution strategies based on content characteristics. One or more embodiments may utilize rate-distortion optimization functions to balance compression efficiency with output quality. Bit allocation may be performed at multiple scales, from macro-level distribution across major content regions to fine-grained allocation within specific areas. Distribution strategies may account for factors such as content complexity, perceptual importance, and quality requirements.

Quality assessment subsystems in disclosed embodiments may employ multiple metrics to evaluate compressed output. These metrics may include perceptual quality scores that align with human visual or auditory perception. In one or more embodiments, quality assessment may combine objective measurements with perceptual metrics to provide comprehensive quality evaluation. Assessment results may be stored in quality metrics databases, enabling analysis of quality trends and performance optimization over time.

Feedback control subsystems in disclosed embodiments may implement various control strategies to modify quantization parameters. These strategies may range from simple threshold-based adjustments to sophisticated predictive control algorithms. In one or more embodiments, feedback control may utilize quality history databases to inform parameter adjustment decisions. Parameter modifications may be implemented gradually to maintain system stability while ensuring optimal compression performance.

Disclosed embodiments may store intermediate processing results between analysis and compression stages, enabling efficient processing and parameter optimization. Storage subsystems may maintain historical quantization parameters and quality measurements, which can be used to improve future compression operations. In one or more embodiments, quality metrics databases may store detailed quality measurements and analysis results, providing valuable data for system optimization and performance tuning.

Disclosed embodiments may store intermediate processing results between analysis and compression stages, enabling efficient processing and parameter optimization. Storage subsystems may maintain historical quantization parameters and quality measurements, which can be used to improve future compression operations. In one or more embodiments, quality metrics databases may store detailed quality measurements and analysis results, providing valuable data for system optimization and performance tuning.

Integration with base compression systems may occur at multiple points in data processing flow. In one or more embodiments, adaptive quantization subsystems may receive frequency domain data from DCT subsystems after initial subband creation. This integration point enables content-aware quantization to be applied to frequency components before they enter compression stages. For example, quantization parameters may be dynamically adjusted for different frequency subbands based on their perceptual importance and content characteristics.

Bit allocation engines may enhance existing compression subsystems by providing optimized bit distribution across frequency subbands. In one or more embodiments, bit allocation decisions may consider both frequency characteristics from DCT operations and content analysis results. This combined approach can enable more efficient compression while maintaining quality in perceptually important regions. Allocation engines may, for example, assign more bits to low-frequency subbands containing critical image features while reducing allocation to high-frequency subbands in regions with less perceptual significance.

Quality assessment subsystems may analyze compressed output before and after arithmetic coding stages. In one or more embodiments, quality metrics may be collected at multiple points in compression pipeline to enable comprehensive quality control. These measurements may feed back to both adaptive quantization and bit allocation stages, creating multiple optimization loops within compression system. For example, quality metrics from compressed output may influence both quantization parameters and bit allocation strategies for subsequent data blocks.

Feedback paths in disclosed embodiments may span multiple processing stages. Control signals from quality assessment may adjust parameters in preprocessing, DCT, compression, and arithmetic coding subsystems. This multipoint feedback architecture can enable coordinated optimization across entire compression pipeline. Parameter updates may be synchronized across different stages to maintain stable and efficient operation throughout system.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing subsystems, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "neural network" refers to a computer system modeled after the network of neurons found in a human brain. The neural network is composed of interconnected nodes, called artificial neurons or units, that work together to process complex information.

The term "bitstream" refers to a binary sequence of data representing the compressed version of input data.

The term "autoencoder" refers to a type of neural network architecture that can learn compact representations of data.

Conceptual Architecture

FIG. 1 is a block diagram illustrating an exemplary system architecture for compressing raw digital data (raw data). The raw data can include binary data, represented as a series of 0s and 1s. The raw data can be uncompressed data. According to an embodiment, raw data 104 is input to the data compression application 110. The raw data 104 can include video data, audio data, telemetry data, analog signal data, image data, radar data, IoT sensor data, and/or other suitable type of data.

The data compression application 110 can include a data preprocessing subsystem 112. The data preprocessing subsystem 112 can perform one or more operations on the raw data 104. The preprocessing can include a data normalization process. In embodiments, the data normalization process can be used to adjust the scale or distribution of data to make it consistent and comparable across different datasets or features. In embodiments, the normalization can be used to ensure that each feature contributes properly to the model's training process or for improving the efficiency of data compression algorithms. In one or more embodiments, the normalization can include Min-Max normalization, decimal scaling, logarithmic transformation, unit vector normalization, and/or Z-score normalization. Normalizing data before compression offers several advantages that enhance both the efficiency and quality of the compression process. Normalized data can have less variability and be more uniformly distributed, which can improve the ability of compression algorithms to identify patterns and redundancies, thereby potentially resulting in higher compression ratios, improved storage and transmission efficiency, and/or better performance of machine learning models.

The preprocessing can include a quantization process. In embodiments, the data quantization process can be used to reduce the number of bits needed to represent information by approximating values with a limited set of discrete levels. The data quantization process can convert a continuous range of values into a finite set of levels, which can then be encoded more compactly. Embodiments can include dividing the range of input values into intervals (or bins), each associated with a quantization level. The size of these intervals is determined by the quantization resolution. One or more embodiments may utilize uniform quantization, in which intervals between levels are equally spaced. Alternatively, one or more embodiments may utilize non-uniform quantization, in which intervals are not equally spaced, and more levels are assigned to ranges with higher data density (e.g., using logarithmic spacing).

The preprocessing can include a noise reduction process. In embodiments, the noise reduction process can be used to remove or reduce unwanted disturbances from the input signal. This process enhances the quality and accuracy of the data by filtering out irrelevant or extraneous information that can interfere with subsequent processing tasks, such as compression, analysis, or transmission. One or more embodiments can include low-pass filters, high-pass filters, band-pass filters, notch filters, median filters, and/or other suitable types of filters. One or more embodiments can utilize a machine learning model that is trained to identify and remove noise. Thus, embodiments can identify complex patterns of noise that traditional filters might miss.

The preprocessing can include an outlier reduction process. In embodiments, the outlier reduction process can be used to identify and handle extreme values that deviate significantly from the majority of the data. Outliers can arise due to various reasons, including measurement errors, data entry mistakes, or genuine but rare occurrences. These extreme values can distort analysis, modeling, and data compression results. One or more embodiments can perform outlier reduction by utilizing a Z-score method, interquartile range (IQR) method, Euclidian distance technique, and/or other suitable techniques.

The preprocessed data is input to discrete cosine transform (DCT) subsystem 114. The Discrete Cosine Transform (DCT) is a mathematical technique well-suited for signal and/or image processing. The DCT represents data, such as an image, as a sum of sinusoids with varying magnitudes and frequencies. The discrete cosine transform subsystem 114 is configured to compute the two-dimensional DCT of an image, capturing essential features. In embodiments, the input image is divided into blocks (e.g., 8-by-8 or 16-by-16), and a DCT is computed for each block, yielding coefficients that are used as part of the compression/decompression process. The output of the discrete cosine transform (DCT) subsystem 114 is input to the compression subsystem 116. The compression subsystem 116 is configured to implement a latent feature learning block, wherein the latent feature learning block is configured and disposed to generate a latent space representation corresponding to the multiple groups of subbands. In embodiments, the subbands include a DC subband, and one or more AC subbands, where each AC subband represents a frequency range. In embodiments, a DC subband and 15 AC subbands are used, for a total of 16 subbands (i.e., 16 channels).

The compression subsystem 116 may further perform subband grouping. The subband grouping can include grouping subbands into a high frequency (HF) group, and one or more low frequency (LF) groups. In embodiments, the compression subsystem 116 groups the subbands into two low frequency groups (LF1, and LF2), and a high frequency group (HF). In one or more embodiments, one or more subbands may be discarded. In embodiments, the discarding includes discarding one or more subbands in the high frequency group, as those subbands often do not contain large amounts of meaningful information that is beneficial for data compression purposes. Accordingly, discarding one or more subbands can help improve the compression ratio when compressing raw data 104. The compression subsystem 116 may further include a neural network to process each subband individually. The neural network can include an autoencoder, an implicit neural representation (INR), a deep learning neural network, and/or other suitable neural network. In embodiments, the compression subsystem 116 comprises programming instructions that when operating on the processor, cause the processor to discard one or more subbands prior to generating the latent space representation. In embodiments, the compression subsystem 116 further comprises programming instructions that when operating on the processor, cause the processor to implement a context network, wherein the context network is configured to compute a thumbnail version of the latent space representation. In embodiments, the compression subsystem further comprises programming instructions that when operating on the processor, cause the processor to implement a multi-stage context recovery subsystem, wherein the multi-stage context recovery subsystem comprises a first loss function associated with the first low frequency group, a second loss function associated with the second low frequency group, and a third loss function associated with the high frequency group. In embodiments, at least one of the first loss function, second loss function, and third loss function is based on a weighting scheme. In embodiments, at least one of the first loss function, second loss function, and third loss function is optimized for data compression and/or decompression.

The output of the compression subsystem 116 can be input to arithmetic coder subsystem 118. In embodiments, the arithmetic coder subsystem 118 is configured to represent a string of characters using a single fractional number between 0.0 and 1.0. Frequently occurring symbols are stored with fewer bits, while rare symbols use more bits. In one or more embodiments, the arithmetic coder subsystem 118 can implement adaptive arithmetic coding, in which case the arithmetic coder subsystem 118 adapts to changing probabilities during the encoding process. The output of the arithmetic coder subsystem 118 can serve as a compressed data file 150. A compressed data file such as compressed data file 150 can be efficiently stored and/or transmitted via a radio communications channel or other suitable communications network, to a receiving device, where it can then be decompressed using corresponding decompression techniques.

Figure 2:
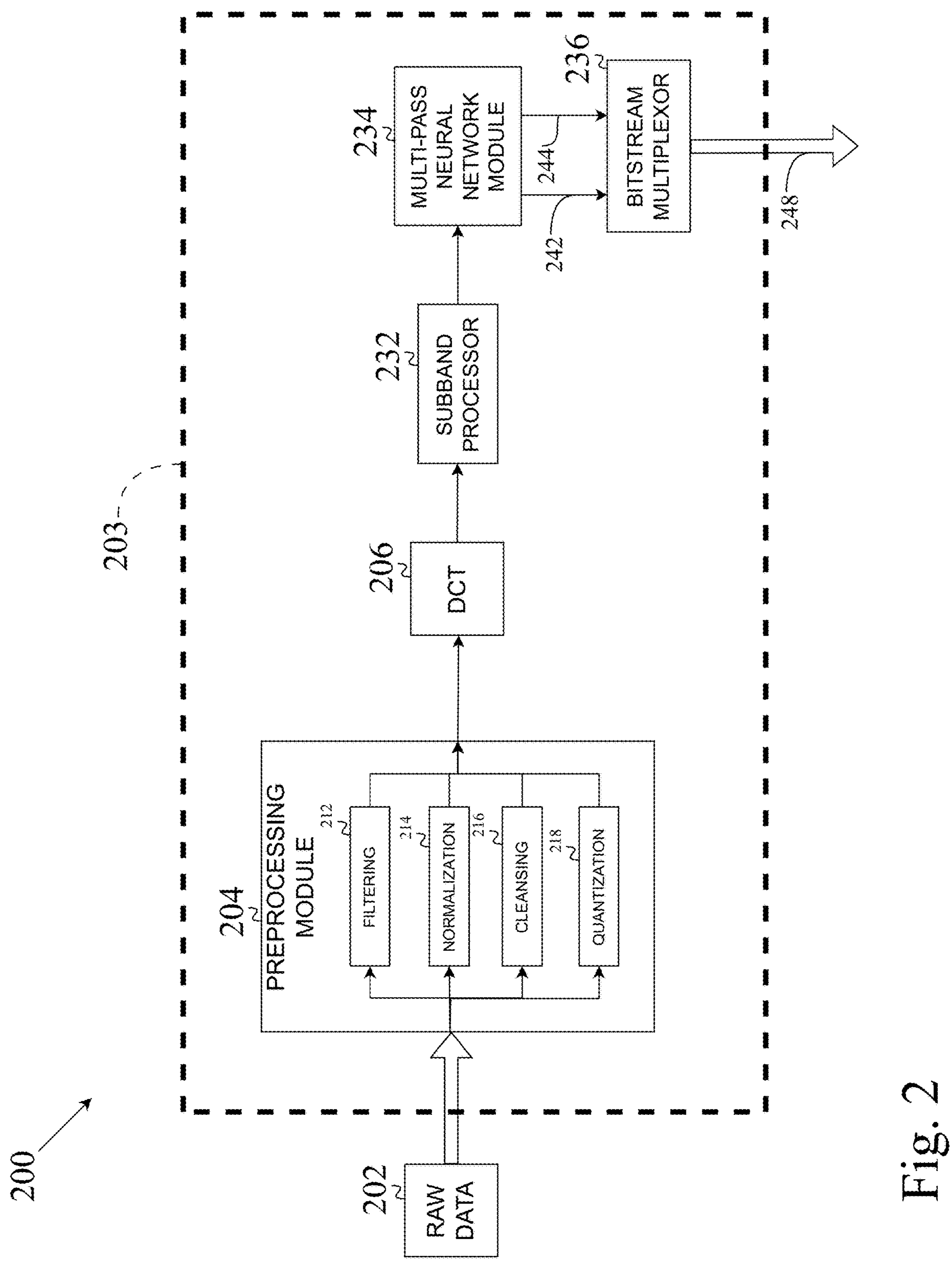
FIG. 2 is a block diagram showing details of an implementation for compressing uncompressed data with a multi-pass neural network module, according to an embodiment.

FIG. 2 is a block diagram 200 showing details of an implementation for compressing uncompressed data with a multi-pass neural network module, according to an embodiment. Raw data 202 is input to data compression system 203. Data compression system 203 includes preprocessing module 204. Preprocessing module 204 can include one or more submodules that provide functionality that may be applied sequentially or concurrently to the input raw data 202. The submodules can include a filtering submodule 212. The filtering submodule 212 can include functions and instructions, that when executed by the processor of a computing device, cause the computing device to perform one or more filtering operations. The filtering operations can include low-pass filtering, high-pass filtering, bandpass filtering, notch filtering, and/or other suitable types of filtering. The submodules can include a normalization submodule 214. The normalization submodule 214 can include functions and instructions, that when executed by the processor of a computing device, cause the computing device to perform one or more normalizing operations. The normalizing operations can include Min-Max normalization, decimal scaling, logarithmic transformation, unit vector normalization, Z-score normalization, and/or other suitable types of normalization. The submodules can include a cleansing submodule 216. The cleansing submodule 216 can include functions and instructions, that when executed by the processor of a computing device, cause the computing device to perform one or more cleansing operations. The cleansing operations can include performing data integrity checks, interpolation, extrapolation, estimating missing data points, deleting outlier data points, and/or other suitable types of data cleansing. The submodules can include a quantization submodule 218. The quantization submodule 218 can include functions and instructions, that when executed by the processor of a computing device, cause the computing device to perform one or more quantization operations. The quantization operations can include linear quantization, non-linear quantization, logarithmic quantization, and/or other suitable types of data quantization.

One or more preprocessing operations may be performed sequentially. In embodiments, the input raw data 202 is first processed by the cleansing submodule 216, followed by the normalization submodule 214, and then the filtering submodule 212. In some embodiments, the raw data 202 may be an analog signal that is quantized by the quantization submodule 218. In some embodiments, the raw data 202 may be a digital signal that is re-quantized by the quantization submodule 218. The re-quantization can serve to reduce the size of the data to be stores, enabling more efficient storage or transmission. In embodiments, the re-quantization can include lowering the bit depth, thereby reducing the amount of data required to represent the signal. Furthermore, the re-quantization of disclosed embodiments can help reduce the impact of noise in a digital signal. In cases where a signal has been corrupted by noise or transmission errors, re-quantizing to a lower bit depth can sometimes mask the noise, improving perceived quality.

The output of the preprocessing module 204 is then input to a discrete cosine transform (DCT) module 206. The DCT module 206 can partition data into blocks, and process each block, transforming data values, such as pixel values, into frequency components. The frequency components are then input to subband processor 232. The subband processor 232 can group frequency components into one or more subbands. The subbands that have little to no contribution to the original data can be removed, thereby enabling an effective lossy compression feature of disclosed embodiments. The remaining subbands that were not removed are then input to multi-pass neural network module 234. The multi-pass neural network module 234 can be configured to create latent spaces through multiple passes. A first latent space can be created from the data provided by subband processor 232. Then a second latent space can be created based on the first latent space. This process can be repeated for multiple passes. In general, there can be latent space (0), latent space (1) . . . latent space (X−1), latent space (X), and so on. Latent space (X) is based on latent space (X−1), which is based on latent space (X−2), and so on. Latent space (0) is the special case of the initial latent space based on the data provided by subband processor 232.

Latent spaces can serve as a compressed representation of the input data, capturing the key features without storing all the original information. Thus, disclosed embodiments can enable efficient storage and transmission of data, especially in scenarios like image compression, where the latent space of an autoencoder effectively compresses image data. In embodiments, a latent space might capture features at one level of abstraction, and further processing in another latent space can capture higher-level abstractions. Embodiments may utilize Hierarchical variational autoencoders and/or deep generative models that use multiple levels of latent spaces to capture different levels of abstraction in data. In embodiments, for an image compression application, the first latent space might represent basic features (such as edges and textures in an image), while a second latent space could represent more abstract concepts (such as objects or scenes).

Each latent space created by multi-pass neural network module 234 is converted to a bitstream that is well suited for serial communication, and/or storage. The multiple bitstreams, indicated as 242 and 244 are input to bitstream multiplexor 236. While two bitstreams are shown in FIG. 2, in practice, there can be more than two bitstreams provided to bitstream multiplexor 236. Bitstream multiplexor 236 multiplexes the multiple bitstreams into a single bitstream that can be used for input to storage systems and/or communication systems and/or communication networks. In one or more embodiments, the bitstream multiplexor 236 is a computerized component that includes a dedicated processor. In one or more embodiments, the bitstream multiplexor 236 is configured to perform time division multiplexing (TDM). In embodiments, each input bitstream is assigned a specific time slot during which its data is included in the output bitstream 248. The multiplexer cycles through the input bitstreams sequentially, sending bits from each in their designated time slots. The output bitstream 248 contains interleaved data from all inputs. In one or more embodiments, the bitstream multiplexor is configured to perform dynamic multiplexing. With the dynamic multiplexing embodiments, instead of fixed time slots, the multiplexer allocates slots dynamically based on the availability of data. This can lead to more efficient use of bandwidth as empty time slots are minimized for bitstreams that produce less data, such as higher numbered passes of latent space creation. In this way, the larger latent spaces (e.g., latent space (0), and latent space (1)) can receive more timeslots than smaller latent spaces (e.g., latent space (4), and latent space (5)). In embodiments, the multiple input bitstreams may be packetized by the bitstream multiplexor 236. In embodiments, each packet may include a header indicating which latent space the packet belongs to, as well as a packet identification number to indicate a position within the bitstream that a given packet corresponds to. In this way, the multiple bitstreams can be reconstructed as part of a decoding/decompression process to reconstruct the raw data 202. Embodiments can include a bitstream multiplexor, where the bitstream multiplexor is configured to receive as input, the first compressed bitstream and the second compressed bitstream, and output a third compressed bitstream, where the third compressed bitstream comprises data from the first compressed bitstream and the second compressed bitstream.

Figure 3:
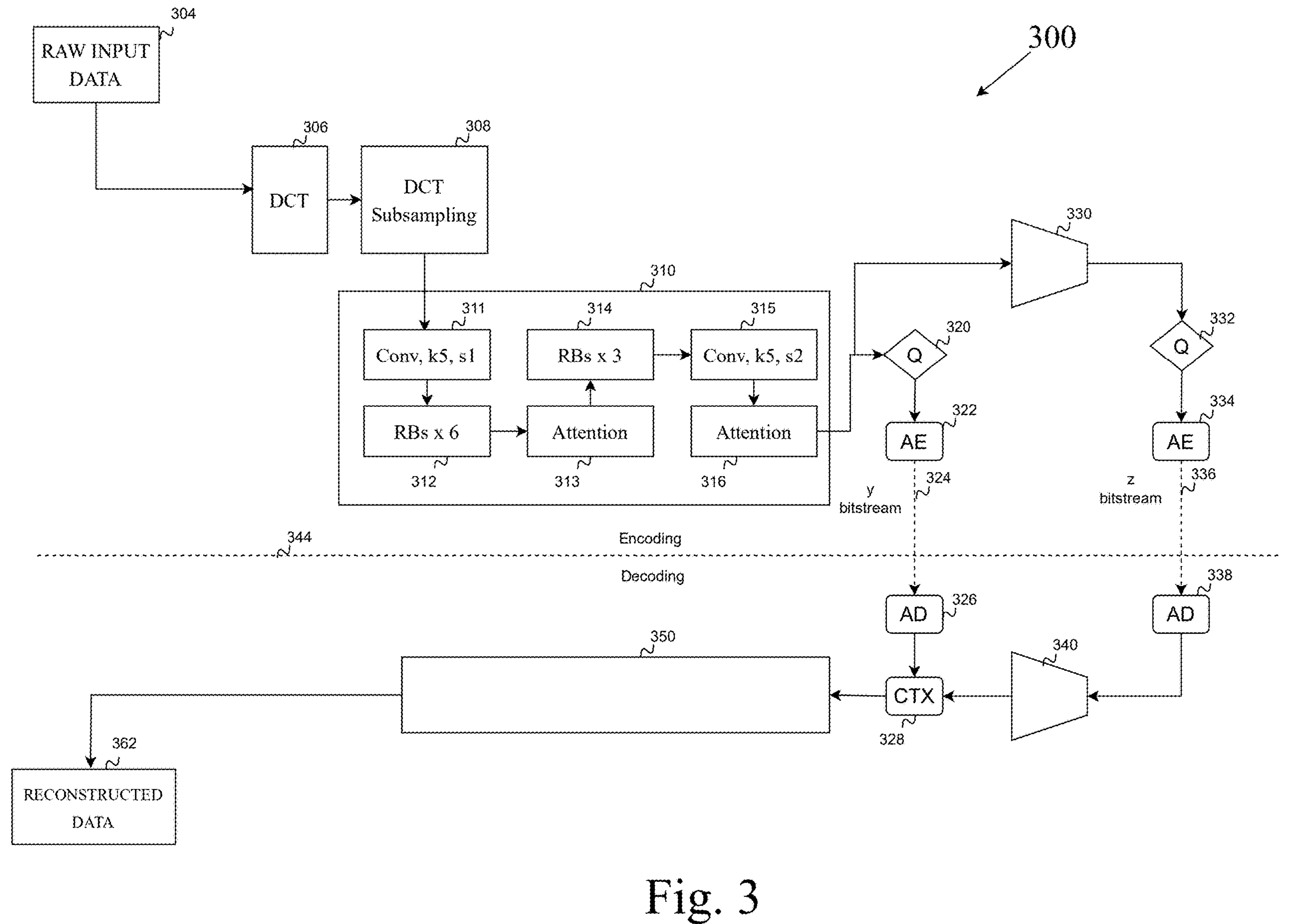
FIG. 3 is a block diagram illustrating an end-to-end architecture for data compression, according to an embodiment.

FIG. 3 is a block diagram illustrating an end-to-end architecture for data compression, according to an embodiment. The architecture 300 receives as input, a raw input data 304 that is input to a DCT block 306. The output of the DCT block 306 is input to DCT subsampling module 308. The output of the DCT subsampling module 308 is input to a compression neural network 310. The compression neural network 310 can include multiple components. In the architecture 300, data input to the compression neural network 310 is routed to convolutional neural network 311. In one or more embodiments, the convolutional neural network 311 has a kernel size of five channels and a stride of 1. In one or more embodiments, the first kernel is configured to have five channels and a stride value of 1. The output of the convolutional neural network 311 is input to first residual block array 312. Residual block array 312 may include a plurality of residual blocks. In one or more embodiments, the first plurality of residual blocks comprises six residual blocks. In one or more embodiments, the residual blocks may be used to mitigate the vanishing gradient problem and improve training efficiency. In embodiments, the residual blocks may include one or more convolutional layers, batch normalization layers, and/or activation functions such as ReLU, softmax, sigmoid, swish, leaky ReLU, and/or other suitable activation functions.

The output of residual block array 312 is input to attention mechanism 313. The attention mechanism can include a query (Q) that represents a vector used to query the relevant information from the data, a key (K) that represents a vector that the query is compared against to determine relevance, and a value (V) that represents a vector containing the actual information or data to be used. In one or more embodiments, attention scores are generated, based on a dot product of the query and key vectors. The attention mechanism may also provide normalization, such as via a softmax function, or other suitable technique.

The output of the attention mechanism 313 is provided to a second residual block array 314. Residual block array 314 may include a plurality of residual blocks. In one or more embodiments, the second plurality of residual blocks comprises three residual blocks. The output of residual block array 314 is input to a second convolutional neural network 315. In one or more embodiments, the convolutional neural network 315 has a kernel size of five channels and a stride of 2. In one or more embodiments, the second kernel is configured to have five channels and a stride value of 2. The output of the convolutional neural network 315 is input to second attention network 316. The output of second attention network 316 can serve as the final stage of the compression neural network 310. The output of the compression neural network 310 can be input to a quantizer module 320. The output of the quantizer module 320 is input to arithmetic encoder 322, to create a first bitstream 324, referred to as the 'y bitstream.'

Additionally, the output of the compression neural network 310 can be input to hyperprior latent feature summarization module 330. The hyperprior latent feature summarization module 330 can be used to implement a hierarchical Bayesian approach to improve the representation and disentanglement of latent features. The latent features can include compressed representations of data that capture essential characteristics of the raw input data 304. The summarization can include extracting and representing the most important features from the latent space. The output of the hyperprior latent feature summarization module 330 can be input to a quantizer module 332. The output of the quantizer module 332 is input to arithmetic encoder 334, to create a second bitstream 336, referred to as the 'z bitstream.' While two bitstreams (324, 326) are shown in FIG. 3, in practice, there can be more than two bitstreams in some embodiments.

Components shown below line 344 are used in decoding (decompressing) compressed data. In one or more embodiments, the components above line 344 may reside at the source of the raw input data acquisition. In one or more embodiments, the components below line 344 may reside at a destination where the compressed data is received. For decoding, the bitstream 324 is input to arithmetic decoder 326, while the bitstream 336 is input to arithmetic decoder 338. In one or more embodiments, the multiple bitstreams may be fed through a bitstream multiplexor, such as shown at 236 in FIG. 2, and then demultiplexed by a corresponding bitstream demultiplexer at the destination device for decompressing the data. The output of the arithmetic decoder 326 is input to context model (CTX) 328. The context model 328 can perform grouping of latent features into distinct groups according to their energy. The context model 328 can serve to optimize the decoding process by enabling reuse of decoded latent feature elements in context modeling. The output of arithmetic decoder 338 is input to the hyperprior latent feature summarization module 340. The output of the hyperprior latent feature summarization module 340 is input to context model (CTX) 328. The output of context model 328 is input to decompression neural network 350 which may include components similar to those described for compression neural network 310, and trained for the task of decompression. The output of the decompression neural network 350 is reconstructed data 362.

Detailed Description of Exemplary Aspects

Figure 4:
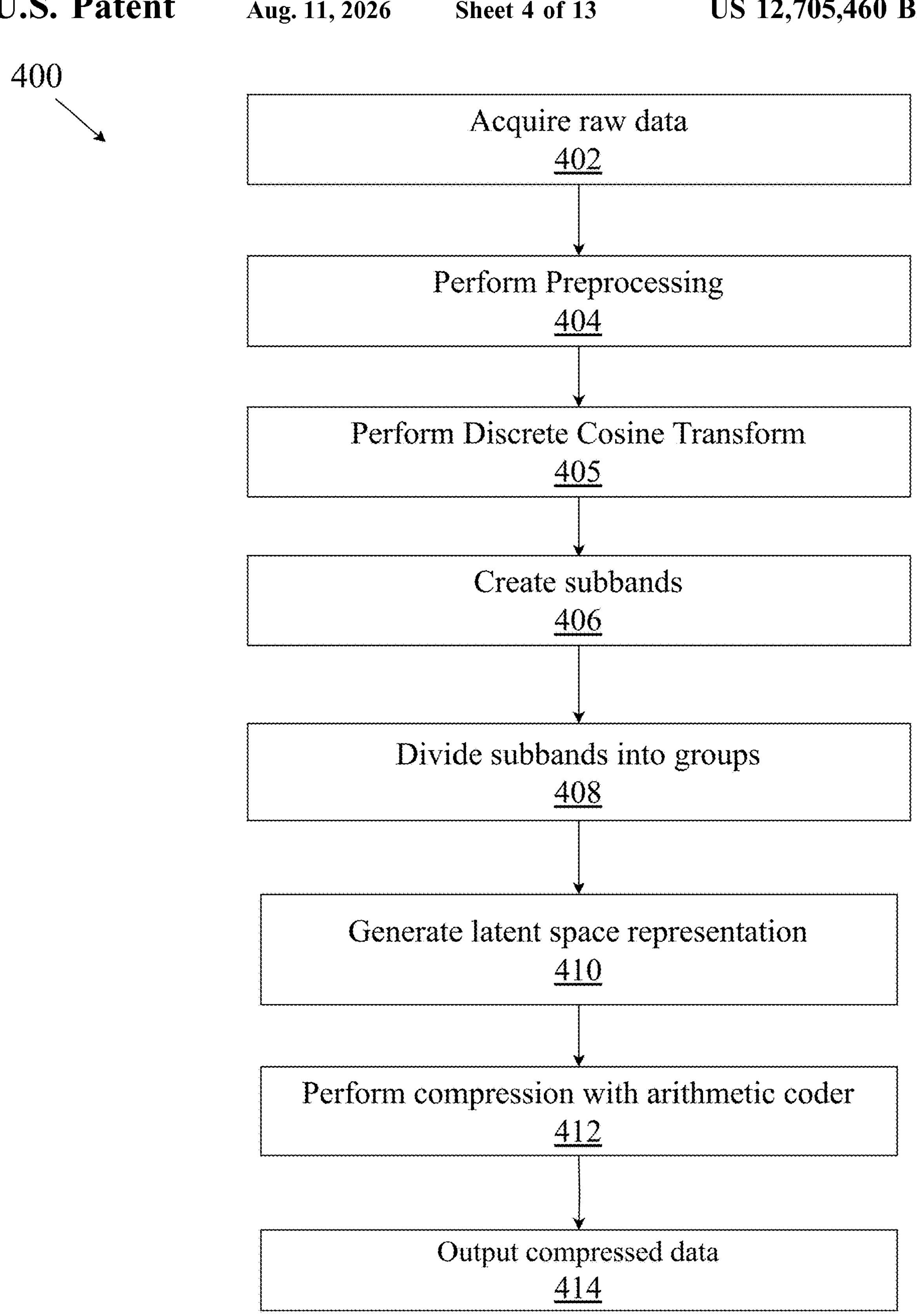
FIG. 4 is a flow diagram illustrating an exemplary method for compressing raw data, according to an embodiment.

FIG. 4 is a flow diagram illustrating an exemplary method 400 for compressing raw (uncompressed and unprocessed) data, according to an embodiment. At block 402, raw data is acquired. The method 400 continues to block 404, where preprocessing is performed. The preprocessing can include filtering, normalization, cleansing, quantization, noise reduction, error correction, and so on. The method 400 continues to block 405, where a discrete cosine transform is performed. The discrete cosine transform can include performing a block-wise tokenization scheme. In embodiments, the discrete cosine transform may be performed utilizing a Discrete Cosine Transform Deblur (DCTD) network. The method 400 continues to block 406, where a plurality of subbands is created. The subbands can include a DC component, as well as multiple AC components of varying frequency ranges. The method 400 continues to block 408, where the subband is divided into groups. In embodiments two or more groups may be created, including one or more low frequency (LF) groups, and one or more high frequency (HF) groups. The method 400 continues with generating a latent space representation 410. In one or more embodiments, the latent space representation may be generated by an autoencoder on a subband basis. Embodiments can include discarding one or more subbands prior to generating the latent space representation. Embodiments can include computing a thumbnail version of the latent space representation. In embodiments, the latent space representation can be generated by a variational autoencoder instead of, or in addition to, an autoencoder. The method 400 continues to block 412, where compression is performed with an arithmetic coder. The arithmetic coder can perform compression of latent space representations on a subband basis. The method 400 continues to block 414, where compressed data that is a compressed version of the raw data acquired at block 402 is output.

Figure 5:
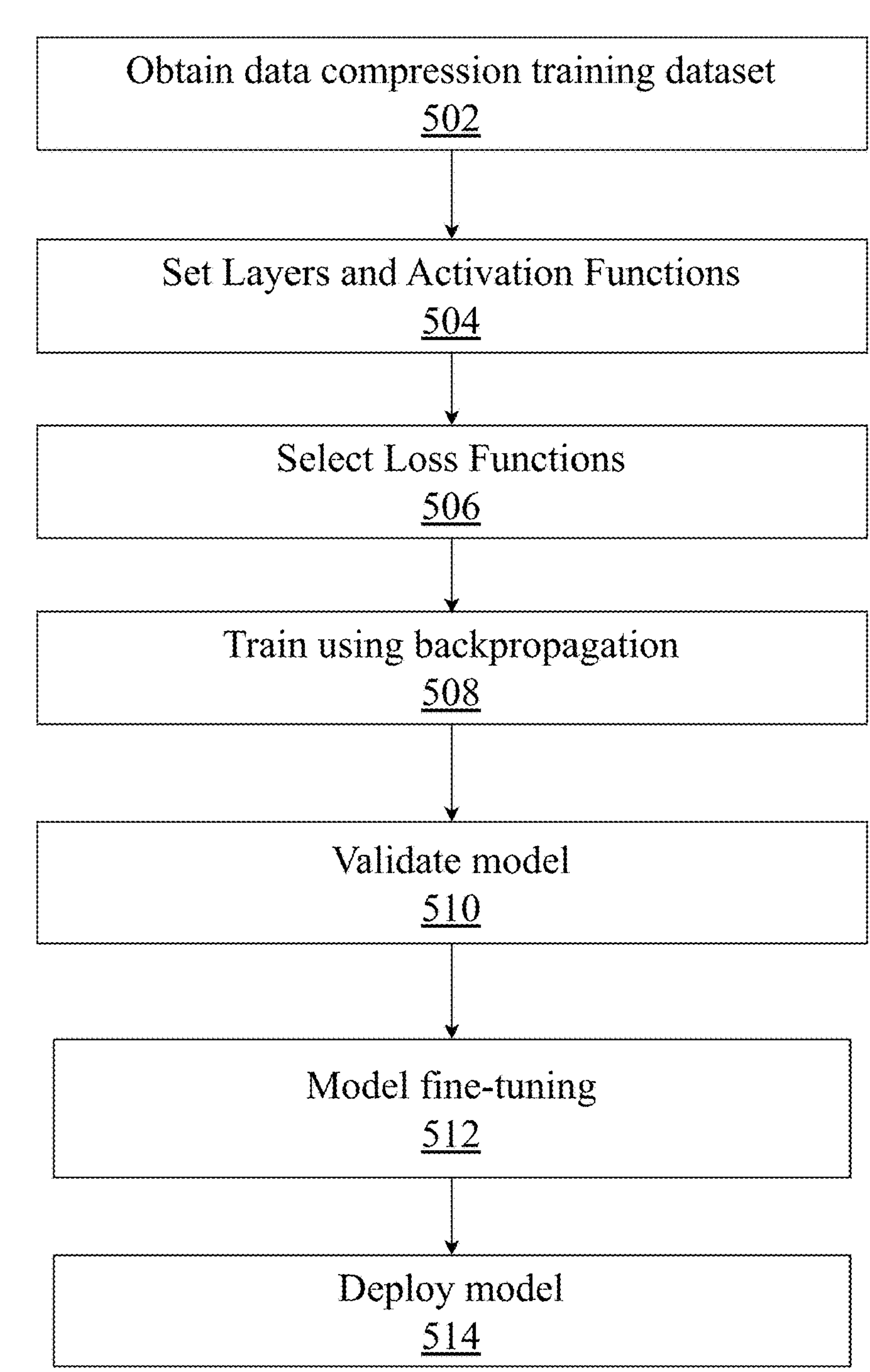
FIG. 5 is a flow diagram illustrating an exemplary method for training a system for compressing and restoring data, according to an embodiment.

FIG. 5 is a flow diagram illustrating an exemplary method for training a system for compressing and restoring data, according to an embodiment. The method 500 starts with obtaining a data compression training dataset at block 502. The data compression training dataset can include multiple samples of representative input data. The method 500 continues with setting layers and activation functions at block 504. In a neural network, layers are the building blocks that form the structure of the network. Each layer comprises a collection of neurons (also called nodes or units), and each neuron performs a specific computation on the input data. The output of one layer becomes the input to the next layer, creating a series of transformations from the input to the output. The layers can include input layers, output layers, and/or hidden layers. The activation functions introduce non-linearity into the model, allowing it to learn and represent complex patterns in the data. In embodiments, the activation functions can include a sigmoid function, a hyperbolic tangent function, a rectified linear unit (ReLU), a Leaky ReLU, softmax function, and/or other suitable activation function. The method 500 continues to block 506 for selecting loss functions. The loss functions are mathematical functions used in machine learning to measure the difference between the predicted values produced by the model and the actual target values from the training data. In one or more embodiments, the loss functions can include Mean Squared Error (MSE), Mean Absolute Error (MAE), Categorical Cross-Entropy, and/or other suitable loss functions. The loss functions can be used to determine if the model is sufficiently trained. The method 500 continues to block 508 for training the model using backpropagation. The backpropagation process can include computing gradients of the loss with respect to the weights and biases in the output layer. These gradients are propagated backward through the neural network to the hidden layer. The method 500 continues to block 510, where the model is validated. The validation can include using an additional set of uncompressed data files that were not part of the training dataset, to serve as a test dataset. The test dataset files can be compressed, reconstructed, and the reconstructed data can be compared with the original input data to confirm proper operation of the model. The method 500 can include model fine-tuning at block 512. The model fine-tuning can include adjusting weights and/or other hyperparameters as needed to improve model output. The method 500 continues to block 514, where the model is deployed for use in its intended application. In this way, disclosed embodiments provide an efficient compression technique for compressing digital data.

Figure 6:
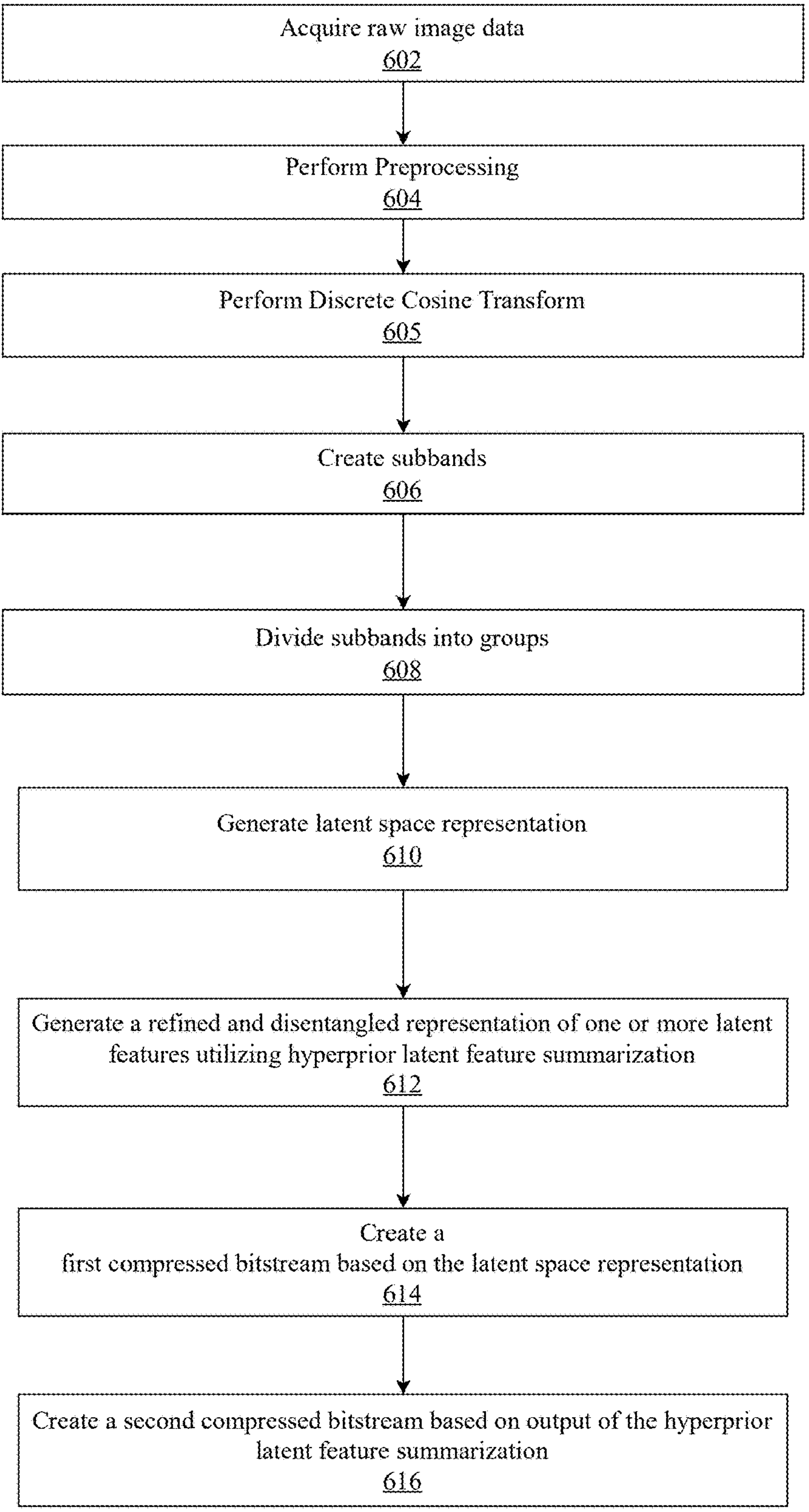
FIG. 6 is a flow diagram illustrating another exemplary method for compressing raw data, according to an embodiment.

FIG. 6 is a flow diagram illustrating another exemplary method for compressing raw data, according to an embodiment. At block 602, raw data is acquired. The method 600 continues to block 604, where preprocessing is performed. The preprocessing can include filtering, normalization, cleansing, quantization, noise reduction, error correction, and so on. Additionally, the preprocessing can include adding metadata to the data (e.g., via prepending a header). The metadata can include location information, date and/or time information, and/or other relevant information.

The method 600 continues to block 605, where a discrete cosine transform is performed. The discrete cosine transform can include performing a block-wise tokenization scheme. In embodiments, the discrete cosine transform may be performed utilizing a Discrete Cosine Transform Deblur (DCTD) network. The method 600 continues to block 606, where a plurality of subbands is created. The subbands can include a DC component, as well as multiple AC components of varying frequency ranges. The method 600 continues to block 608, where the subband is divided into groups. In embodiments two or more groups may be created, including one or more low frequency (LF) groups, and one or more high frequency (HF) groups. The method 600 continues with generating a latent space representation 610. In one or more embodiments, the latent space representation may be generated by an autoencoder on a subband basis. Embodiments can include discarding one or more subbands prior to generating the latent space representation. Embodiments can include computing a thumbnail version of the latent space representation. In embodiments, the latent space representation can be generated by a variational autoencoder instead of, or in addition to, an autoencoder. The method 600 continues to block 612, where a refined and disentangled representation of one or more latent features are generated utilizing hyperprior latent feature summarization. The refined and disentangled representation provides latent features that each capture a distinct and independent factor of variation in the data, and can enable generative modeling. Moreover, the refined and disentangled representation of one or more latent features can serve as a form of noise reduction in that unnecessary or irrelevant information is minimized, leading to more robust models. Thus, the refined and disentangled representation can enable improved classification and regression results.

In one or more embodiments, the hyperprior latent feature summarization includes using a secondary latent variable (the hyperprior) to improve the modeling of uncertainty and dependencies in the primary latent features for raw data. In one or more embodiments, the hyperprior latent feature summarization module comprises a Hierarchical Bayesian Network (HBN). The HBN can include a top layer for representing hyperparameters and/or priors. The HBN can include a bottom layer that represents raw data. The HBN can include one or more middle layers for capture of intermediate latent variables. In one or more embodiments, the HBN may be implemented with multiple nodes that are connected by edges, that serve as directed links to indicate causal and/or dependency relationships between nodes.

The method 600 continues to block 614 where a first compressed bitstream based on the latent space representation is created. In one or more embodiments, an arithmetic encoder is used to create the compressed bitstream. The arithmetic encoder can be configured to estimate a probability of a given symbol, and encode frequently occurring symbols with a smaller representation. All symbols are processed, and the assigned value is converted to a binary representation which forms the compressed bitstream. The method 600 continues to block 616, where a second compressed bitstream based on the output of the hyperprior latent feature summarization is created. The second compressed bitstream may be created using an arithmetic encoder in a similar manner to that described for block 614. While the flow diagram illustrated in FIG. 6 shows two compressed bitstreams, in some embodiments, the process may continue with forming additional compressed bitstreams based on subsequently derived latent space representations.

Figure 7:
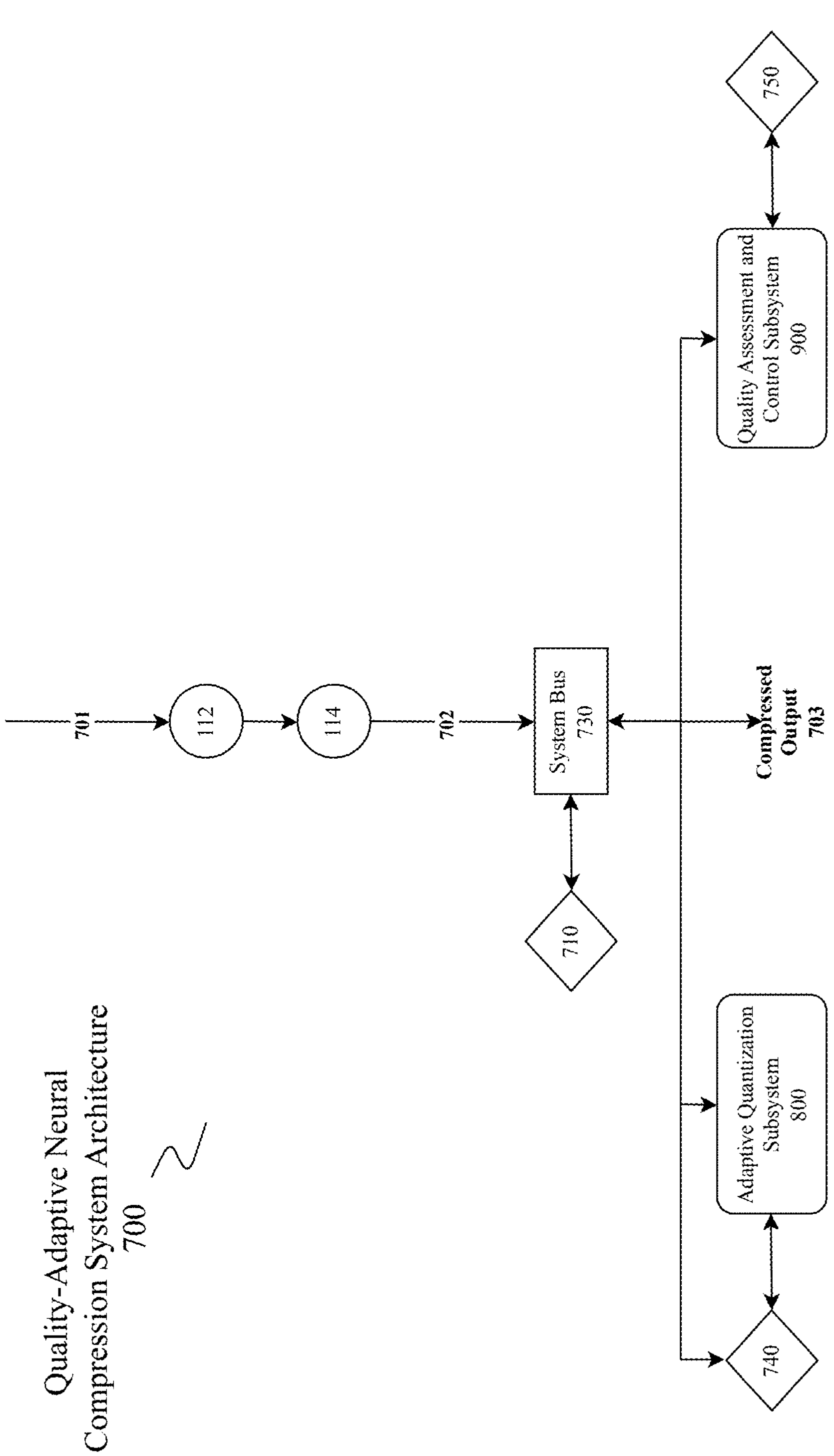
FIG. 7 is a block diagram illustrating exemplary architecture of quality-adaptive neural compression system with dynamic quantization control.

Quality-Adaptive Neural Compression System with Dynamic Quantization Control System Architecture FIG. 7 is a block diagram illustrating exemplary architecture of quality-adaptive neural compression system with dynamic quantization control 700, in an embodiment. Input data 701 is received and processed into uncompressed dataset 702, which may include various types of digital content such as image data, video data, or sensor data. Uncompressed dataset 702 flows to adaptive quantization subsystem 800, which analyzes content characteristics and determines appropriate quantization parameters.

Adaptive quantization subsystem 800 interfaces with quality assessment and control subsystem 900, which monitors compression quality and provides feedback for parameter adjustment. Quality assessment and control subsystem 900 collects metrics from compressed output 703 and stores them in quality metrics database 750 for analysis and optimization purposes.

Base compression integration subsystem 710 coordinates operation between adaptive quantization subsystem 800 and existing compression components, including DCT subsystem 114 and compression subsystem 116. Memory buffer 720 provides temporary storage for intermediate processing results between compression stages. System bus 730 facilitates data transfer between components, while parameter storage 740 maintains quantization parameters and thresholds used by adaptive quantization subsystem 800.

Quality assessment and control subsystem 900 receives data from multiple points in compression pipeline through system bus 730, enabling comprehensive quality monitoring. Parameter adjustments from quality assessment and control subsystem 900 flow back to adaptive quantization subsystem 800, which modifies quantization parameters stored in parameter storage 740. Base compression integration subsystem 710 ensures these parameter updates coordinate properly with existing compression operations.

Compressed output 703 represents final output of quality-adaptive neural compression system 700, which may be stored or transmitted as needed. Quality metrics database 750 maintains historical quality measurements and analysis results, which quality assessment and control subsystem 900 uses to optimize compression parameters over time.

Memory buffer 720 enables efficient processing by providing staging areas between compression stages. Parameter storage 740 maintains current and historical quantization parameters, supporting both immediate compression needs and long-term optimization. System bus 730 provides necessary bandwidth for real-time data transfer between subsystems, supporting both compression operations and quality assessment feedback loops.

In operation, input data 701 enters quality-adaptive neural compression system 700 through preprocessing subsystem 112, which performs operations such as data normalization, noise reduction, and initial quantization to create uncompressed dataset 702. DCT subsystem 114 then processes uncompressed dataset 702 to generate frequency domain representations, which flow through system bus 730 to adaptive quantization subsystem 800. Adaptive quantization subsystem 800 performs content analysis and determines initial quantization parameters stored in parameter storage 740. These parameters flow through system bus 730 to base compression integration subsystem 710, which coordinates with existing compression operations. As data moves through compression stages, intermediate results may be temporarily stored in memory buffer 720. Quality assessment and control subsystem 900 continuously monitors compression performance, storing quality metrics in quality metrics database 750. Based on these metrics, quality assessment and control subsystem 900 generates parameter adjustment signals that flow back through system bus 730 to adaptive quantization subsystem 800, enabling dynamic optimization of compression parameters. This feedback process continues as data moves through compression pipeline, ultimately producing compressed output 703.

One skilled in the art will appreciate that implementation details of quality-adaptive neural compression system 700 may vary based on specific application requirements, hardware configurations, and operational constraints. For example, memory buffer 720 size and system bus 730 bandwidth may be adjusted based on throughput requirements, while quality assessment and control subsystem 900 may implement different quality metrics depending on content type and user requirements. Parameter storage 740 capacity and quality metrics database 750 organization may vary according to historical data retention needs and optimization strategies. Various hardware acceleration techniques, parallel processing approaches, and memory architectures may be employed to meet different performance targets. The specific configuration of adaptive quantization subsystem 800 and selection of quality metrics may be tailored to particular content types, while feedback control strategies may be adapted for different operational scenarios. Implementation choices may consider factors such as processing latency requirements, available computational resources, power consumption constraints, and specific quality objectives.

Figure 8:
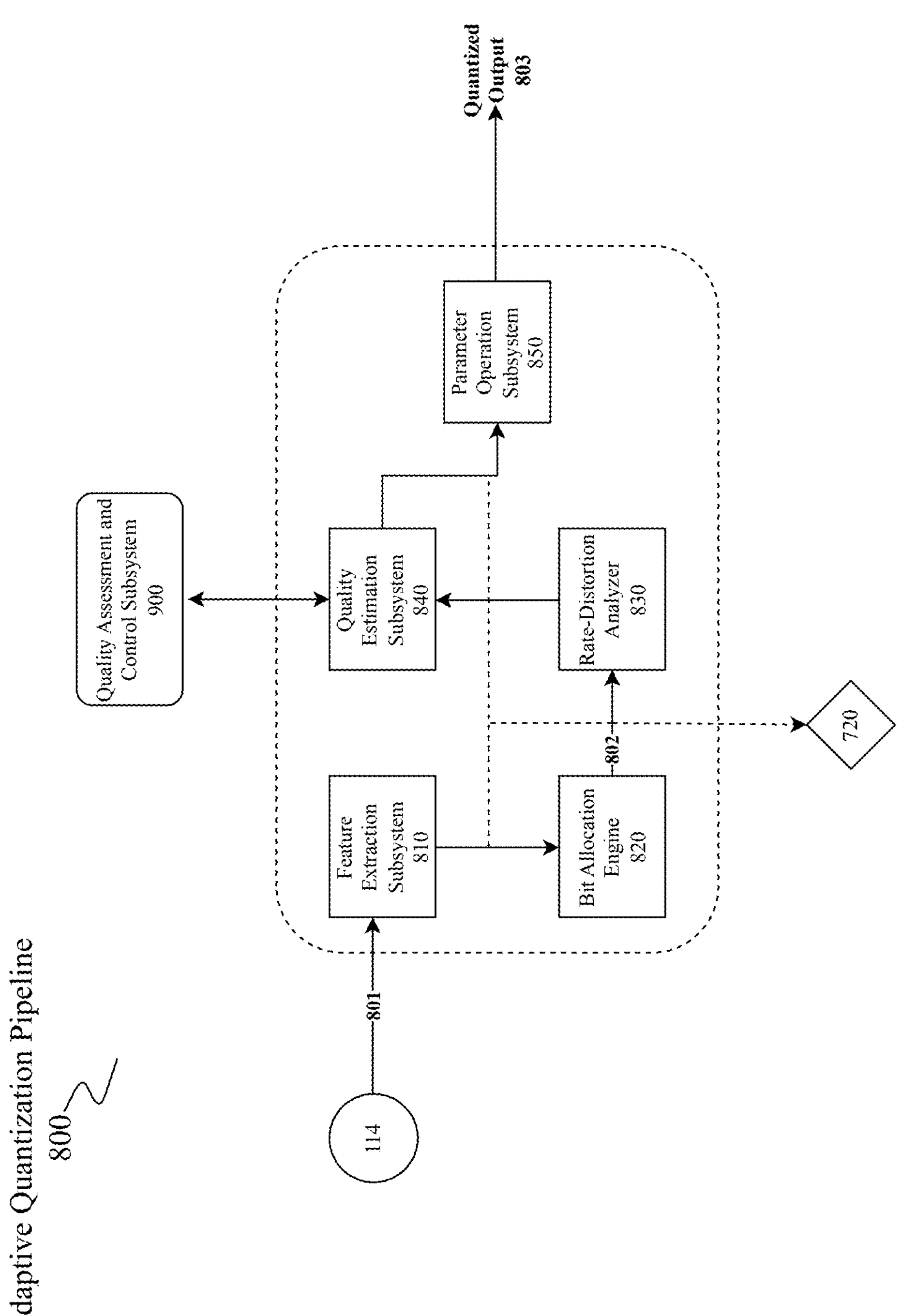
FIG. 8 is a block diagram illustrating exemplary architecture of adaptive quantization pipeline.

FIG. 8 is a block diagram illustrating exemplary architecture of adaptive quantization pipeline 800, in an embodiment. Input features 801 from DCT subsystem 114 flow into content feature extraction subsystem 810, which analyzes frequency domain characteristics and identifies perceptually significant components of input data.

Content feature extraction subsystem 810 may implement various analysis techniques to identify perceptually significant components in input data. For example, frequency analysis may include wavelet decomposition to analyze multi-scale frequency characteristics, or Fourier analysis to examine frequency distributions across different data regions. Pattern recognition techniques may include, in some embodiments, edge detection, texture analysis, or feature point identification. Complexity assessment may utilize entropy measurements, gradient analysis, or statistical variance calculations. In certain implementations, content feature extraction subsystem 810 may employ machine learning models trained to identify regions of perceptual importance. Generated feature metadata may include spatial frequency maps, content complexity metrics, or perceptual significance scores for different data regions.

Bit allocation engine 820 receives analyzed features from content feature extraction subsystem 810 and determines optimal bit distribution across different portions of input data. For example, regions with high frequency content or complex textures may receive higher bit allocations compared to smooth or low-detail areas. Bit allocation decisions may incorporate psychovisual models to align with human perception characteristics. In some embodiments, bit allocation engine 820 may implement adaptive thresholding based on content type, with different allocation strategies for natural images, computer-generated graphics, or text regions. Quantization parameters 802 may specify variable quantization step sizes, compression ratios, or bit depth assignments across frequency bands and spatial regions. Bit allocation engine 820 may also consider buffer constraints and target bit rates when determining parameter values.

Rate-distortion analyzer 830 processes both content features and initial bit allocations to optimize quality-size tradeoffs using various optimization strategies. In some implementations, rate-distortion analyzer 830 may employ Lagrangian optimization to find optimal operating points along rate-distortion curves. Multiple quality metrics may be evaluated simultaneously, such as mean squared error, structural similarity, or perceptual quality scores. Operating points may be selected using convex optimization, gradient descent, or other numerical optimization methods. Rate-distortion analyzer 830 may maintain historical performance data to guide operating point selection, potentially implementing machine learning models to predict optimal parameters based on content characteristics. Results from rate-distortion analysis may include compression ratio estimates, quality impact predictions, and recommended parameter adjustments.

Parameter optimization subsystem 850 combines multiple inputs to generate final quantized output 803 through iterative refinement processes. Feedback signals may include real-time quality measurements, bandwidth utilization metrics, or processing latency data. In some embodiments, parameter optimization subsystem 850 may implement proportional-integral-derivative (PID) control loops for stable parameter adjustment, or may utilize more sophisticated control strategies such as model predictive control or adaptive control systems. Parameter updates may be synchronized across different compression stages to maintain consistency. Optimization criteria may include quality thresholds, target bit rates, or processing time constraints. Historical performance data stored in parameter storage 740 may inform optimization decisions, potentially enabling predictive parameter adjustment based on observed patterns in similar content types.

Throughout operation, intermediate results and parameters may be stored in memory buffer 720, while historical parameters and optimization data are maintained in parameter storage 740. Quality metrics database 750 stores quality assessment results which parameter optimization subsystem 850 may use to refine future parameter selections. Integration with existing compression subsystem 116 occurs through base compression integration subsystem 710, which ensures proper coordination between adaptive quantization and subsequent compression stages.

Machine learning models utilized in adaptive quantization subsystems may include various architectures suited for different aspects of content analysis and parameter optimization. For example, convolutional neural networks may be employed for spatial feature extraction and content classification, while recurrent neural networks may process temporal patterns in sequential data. Transformer-based models may, in some embodiments, analyze long-range dependencies within content, while lightweight neural networks may perform rapid feature extraction for real-time processing scenarios.

Training data for these models may come from diverse sources representing different content types and compression scenarios. For example, training datasets may include combinations of natural images, computer-generated graphics, video sequences, or sensor data. In some embodiments, training data may incorporate human perceptual ratings to align model outputs with subjective quality assessments. Training datasets may also include examples of various compression artifacts, enabling models to learn relationships between quantization parameters and resulting quality impacts.

Model training procedures may utilize various approaches depending on specific requirements. For example, supervised learning may train models using paired examples of input content and optimal compression parameters. In some embodiments, reinforcement learning approaches may optimize models using quality metrics as reward signals. Transfer learning techniques may adapt pre-trained models to specific content types or compression requirements. Training processes may incorporate curriculum learning, starting with simple compression scenarios and progressively introducing more complex cases.

Quality assessment models may be trained using multi-task learning approaches. For example, models may simultaneously predict perceptual quality scores, identify potential artifact regions, and estimate optimal parameter adjustments. In some implementations, generative models may learn content-specific compression strategies by analyzing patterns in high-quality reference data. Ensemble methods may combine predictions from multiple specialized models trained on different aspects of compression quality assessment.

Model adaptation and fine-tuning processes may occur during system operation. For example, online learning techniques may gradually adjust model parameters based on real-time compression performance data. In some embodiments, meta-learning approaches may enable rapid adaptation to new content types or quality requirements. Feedback signals from quality assessment subsystems may guide incremental model updates, potentially incorporating active learning strategies to focus adaptation on challenging compression scenarios.

In operation, input features 801 from DCT subsystem 114 enter adaptive quantization pipeline 800 and flow to content feature extraction subsystem 810, which generates content metadata including frequency characteristics and perceptual importance metrics. This metadata flows to bit allocation engine 820, which uses it to determine initial bit distribution strategies and generate quantization parameters 802. These parameters, along with content features, flow to rate-distortion analyzer 830, which evaluates quality-size tradeoffs across multiple operating points. Results from this analysis flow to quality estimation subsystem 840, which predicts quality impacts of different parameter choices. These predictions, combined with actual feedback from quality assessment and control subsystem 900, flow to parameter optimization subsystem 850, which generates final quantized output 803. Throughout this process, intermediate results may be stored in memory buffer 720, with historical parameters and optimization data maintained in parameter storage 740. Quality metrics database 750 stores assessment results which flow back through feedback paths to influence parameter optimization decisions. Final quantized output 803 then flows to compression subsystem 116 for further processing.

Figure 9:
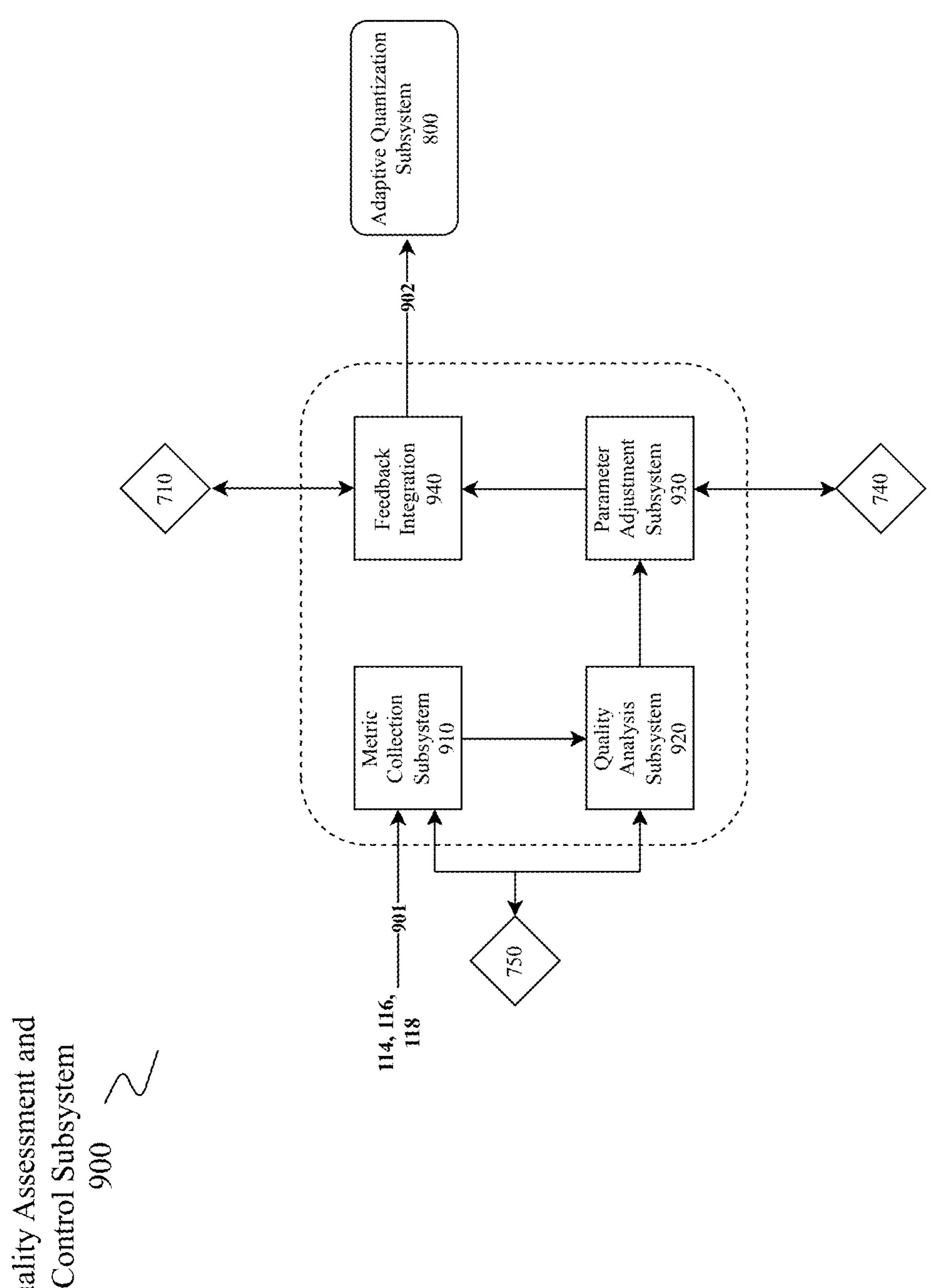
FIG. 9 is a block diagram illustrating exemplary architecture of quality assessment and control subsystem.

FIG. 9 is a block diagram illustrating exemplary architecture of quality assessment and control subsystem 900, in an embodiment. Quality assessment and control subsystem 900 receives input metrics 901 from various points in compression pipeline through system bus 730.

Input metrics 901 flow into metric collection subsystem 910, which aggregates multiple types of quality measurements. For example, metrics may include peak signal-to-noise ratio (PSNR) values from compressed output 703, structural similarity index measurements (SSIM) from intermediate stages, and processing latency indicators. In some embodiments, metric collection subsystem 910 may also monitor hardware resource utilization such as memory buffer 720 occupancy levels and system bus 730 bandwidth consumption rates.

Metric collection subsystem 910 interfaces with quality metrics database 750 through a data logging protocol that may include timestamping, metadata tagging, and data validation. For example, collected measurements may be organized into time-series datasets enabling temporal analysis of quality trends. Quality analysis subsystem 920 may implement various analysis methods such as moving averages, statistical variance calculations, or anomaly detection algorithms to evaluate compression performance. In some embodiments, quality analysis subsystem 920 calculates composite quality scores combining multiple metrics such as PSNR, SSIM, and compression ratio. The subsystem may also employ machine learning models trained to identify patterns indicating potential quality degradation in compressed output 703.

Parameter adjustment subsystem 930 processes analyzed metrics using configurable control algorithms that may include proportional-integral-derivative (PID) control, fuzzy logic control, or model predictive control strategies. For example, parameter adjustment subsystem 930 may maintain multiple control loops operating at different timescales, from rapid adjustments based on instantaneous quality measurements to longer-term optimization based on historical trends stored in parameter storage 740. Control signal generation may incorporate rate limiting and stability constraints to prevent oscillations in compression parameters.

Feedback integration subsystem 940 implements synchronization protocols that may include parameter update queuing, atomic parameter modifications, and rollback capabilities. For example, parameter updates may be scheduled during natural processing boundaries such as frame transitions or block boundaries. In some embodiments, feedback integration subsystem 940 may implement a handshaking protocol with base compression integration subsystem 710 to ensure parameter modifications occur at appropriate times within compression subsystem 116 processing flow.

Quality assessment and control subsystem 900 maintains continuous operation through various implementation approaches. For example, metric collection subsystem 910 may utilize circular buffers to capture sliding windows of performance data from multiple pipeline stages. Quality analysis subsystem 920 may implement parallel processing paths for different quality metrics, enabling simultaneous evaluation of objective measurements like bitrate and subjective factors such as perceptual quality scores.

Parameter adjustment subsystem 930 may employ adaptive control strategies that modify their behavior based on observed compression characteristics. For example, control parameters such as gain factors or threshold values may be automatically tuned based on content type or quality requirements. In some embodiments, feedback integration subsystem 940 may implement predictive parameter updates by analyzing patterns in historical data from quality metrics database 750. The subsystem may also utilize statistical models to estimate optimal parameter values for different content types and operating conditions.

System bus 730 provides necessary bandwidth for real-time metric collection and parameter distribution, while memory buffer 720 enables efficient processing of quality measurements between assessment stages. Parameter storage 740 maintains both current and historical quantization parameters, supporting informed parameter adjustment decisions. Integration with base compression integration subsystem 710 ensures parameter updates coordinate properly with existing compression operations in compression subsystem 116.

Machine learning models utilized in quality assessment and control subsystem 900 may include various architectures suited for different aspects of quality assessment and parameter optimization. For example, convolutional neural networks may be employed for spatial quality assessment and artifact detection, while recurrent neural networks may process temporal patterns in quality metrics. In some embodiments, transformer-based models may analyze long-range dependencies within quality measurements, while lightweight neural networks may perform rapid quality estimation for real-time feedback control.

Training data for these models may come from diverse sources representing different compression scenarios and quality outcomes. For example, training datasets may include combinations of original and compressed content pairs, human perceptual quality ratings, and historical compression performance logs. In some embodiments, training data may incorporate quality measurements across various content types, compression ratios, and operating conditions. The training datasets may also include examples of compression artifacts and quality degradation patterns, enabling models to learn relationships between compression parameters and resulting quality impacts.

Model training procedures may utilize various approaches depending on specific requirements. For example, supervised learning may train models using paired examples of compression parameters and resulting quality measurements. In some embodiments, reinforcement learning approaches may optimize models using quality metrics as reward signals. Transfer learning techniques may adapt pre-trained models to specific content types or compression requirements. Training processes may incorporate curriculum learning, starting with simple compression scenarios and progressively introducing more complex cases.

Quality assessment models may be trained using multi-task learning approaches. For example, models may simultaneously predict perceptual quality scores, identify potential artifact regions, and estimate optimal parameter adjustments. In some implementations, generative models may learn content-specific compression strategies by analyzing patterns in high-quality reference data. Ensemble methods may combine predictions from multiple specialized models trained on different aspects of compression quality assessment.

Model adaptation and fine-tuning processes may occur during system operation. For example, online learning techniques may gradually adjust model parameters based on real-time compression performance data. In some embodiments, meta-learning approaches may enable rapid adaptation to new content types or quality requirements. Feedback signals from quality assessment and control subsystem 900 may guide incremental model updates, potentially incorporating active learning strategies to focus adaptation on challenging compression scenarios.

In operation, input metrics 901 from DCT subsystem 114, compression subsystem 116, and arithmetic coding subsystem 118 enter quality assessment and control subsystem 900 through system bus 730 and flow to metric collection subsystem 910. Metric collection subsystem 910 processes and aggregates these measurements, storing them in quality metrics database 750 while forwarding current metrics to quality analysis subsystem 920. Quality analysis subsystem 920 evaluates compression performance using both real-time measurements and historical data from quality metrics database 750, generating quality assessment results that flow to parameter adjustment subsystem 930. Parameter adjustment subsystem 930 processes these results along with current and historical parameters from parameter storage 740 to generate control signals. These control signals flow to feedback integration subsystem 940, which coordinates with base compression integration subsystem 710 to synchronize parameter updates. Feedback integration subsystem 940 then sends control output 902 through system bus 730 to adaptive quantization subsystem 800, which applies updated parameters to subsequent compression operations. Throughout this process, memory buffer 720 may provide temporary storage for intermediate results between processing stages, while system bus 730 enables efficient data transfer between subsystems.

Figure 10:
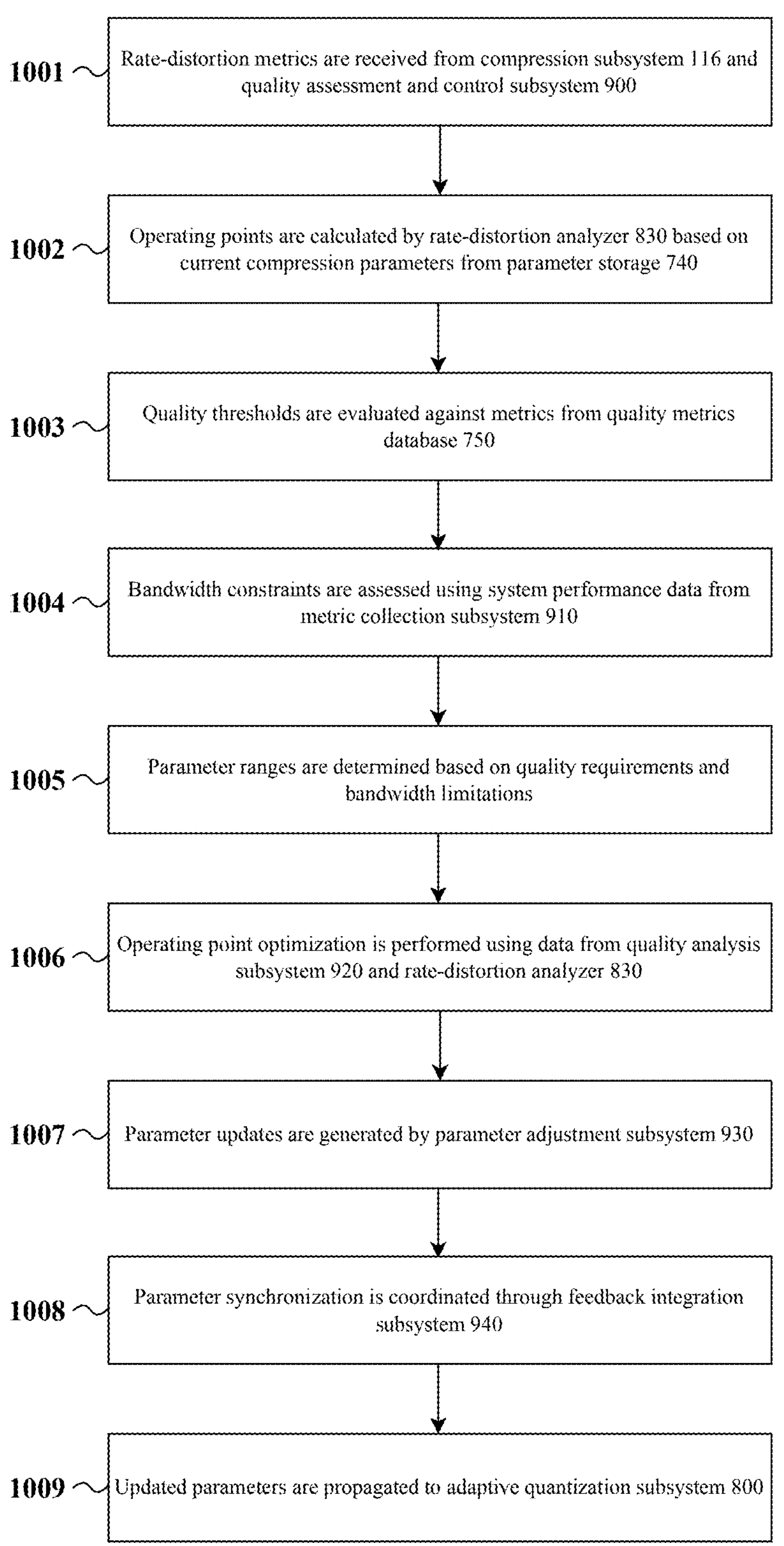
FIG. 10 is a method diagram illustrating the rate-distortion optimization of quality-adaptive neural compression system.

FIG. 10 is a method diagram illustrating the rate-distortion optimization of quality-adaptive neural compression system 700, in an embodiment. Rate-distortion metrics flow from compression subsystem 116 and quality assessment and control subsystem 900 into the optimization pipeline 1001. Operating points are calculated by rate-distortion analyzer 830 using current compression parameters retrieved from parameter storage 740, which may include quantization step sizes, bit allocation ratios, and quality targets 1002. Quality thresholds undergo evaluation against historical performance data and target metrics stored in quality metrics database 750, which may include perceptual quality scores, compression ratios, and artifact measurements 1003. System bandwidth constraints receive assessment through performance data collected by metric collection subsystem 910, including memory utilization, processing latency, and throughput measurements 1004. Parameter ranges for optimization are established based on the evaluated quality requirements and identified bandwidth limitations, creating bounds for subsequent parameter adjustments 1005. Operating point optimization occurs through combined analysis of quality metrics from quality analysis subsystem 920 and rate-distortion data from rate-distortion analyzer 830, potentially employing techniques such as convex optimization or gradient descent 1006. Parameter updates are generated by parameter adjustment subsystem 930, incorporating both the optimized operating points and system stability constraints 1007. Parameter synchronization takes place through feedback integration subsystem 940, which coordinates update timing across compression pipeline components 1008. The optimized parameters flow to adaptive quantization subsystem 800 for implementation in subsequent compression operations 1009.

Figure 11:
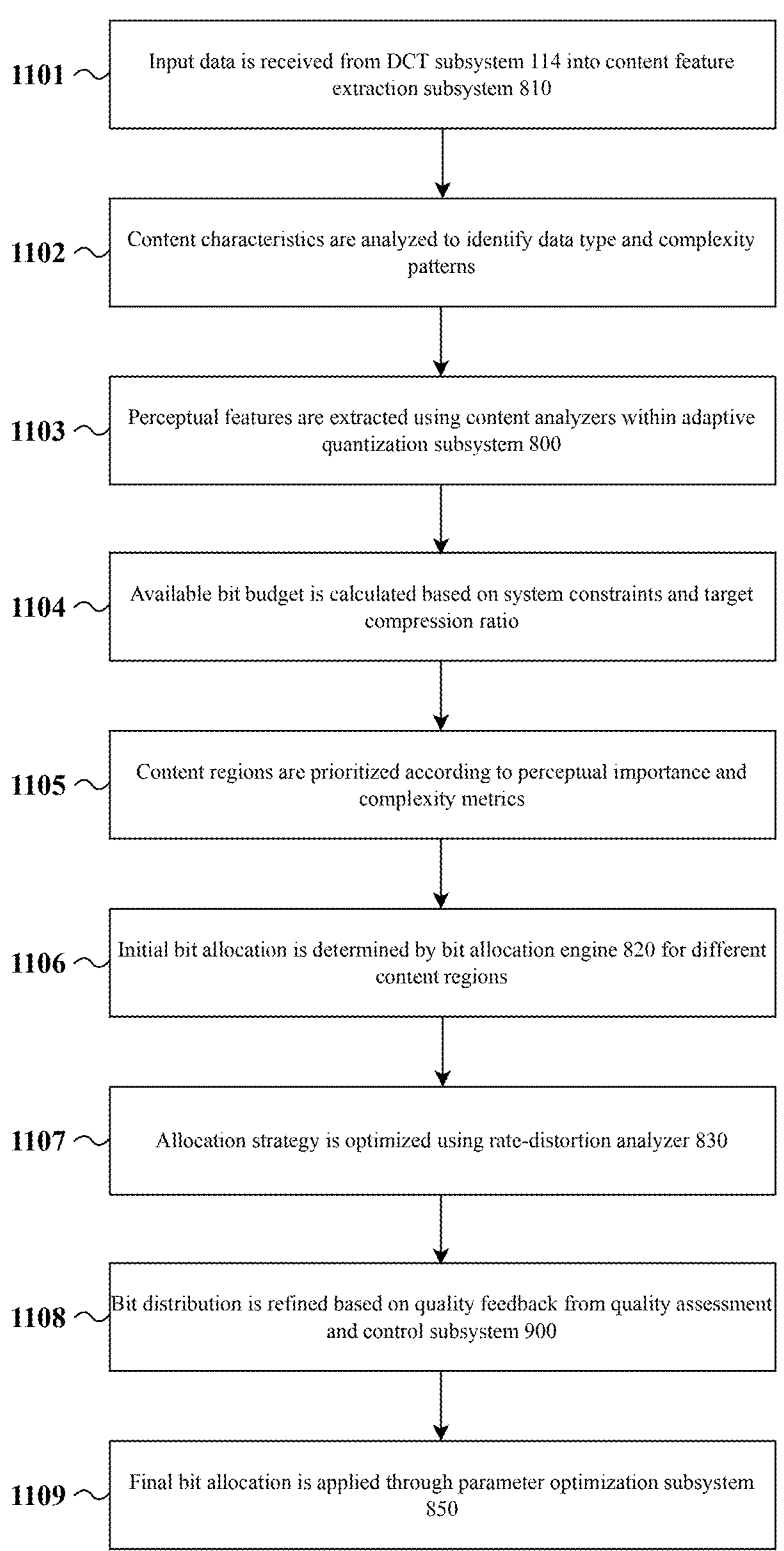
FIG. 11 is a method diagram illustrating the content-aware bit allocation of quality-adaptive neural compression system.

FIG. 11 is a method diagram illustrating the content-aware bit allocation of quality-adaptive neural compression system 700, in an embodiment. Input data flows from DCT subsystem 114 into content feature extraction subsystem 810 for initial processing 1101. Content characteristics undergo analysis to identify data types and complexity patterns, which may include texture analysis, frequency distribution, and spatial complexity measurements 1102. Perceptual features are extracted using content analyzers within adaptive quantization subsystem 800, potentially including edge detection, pattern recognition, and saliency mapping 1103. Available bit budget calculations occur based on system constraints and target compression ratios, taking into account memory buffer 720 capacity and bandwidth limitations 1104. Content regions receive prioritization according to perceptual importance and complexity metrics, with regions of higher visual significance or complex detail receiving higher priority 1105. Initial bit allocation is determined by bit allocation engine 820 for different content regions, distributing bits according to regional priorities and complexity measurements 1106. Allocation strategy undergoes optimization through rate-distortion analyzer 830, which may employ various optimization techniques to balance quality and compression efficiency 1107. Bit distribution receives refinement based on quality feedback signals from quality assessment and control subsystem 900, allowing dynamic adjustment of allocation strategies 1108. Final bit allocation flows through parameter optimization subsystem 850 for implementation in the compression pipeline 1109.

Figure 12:
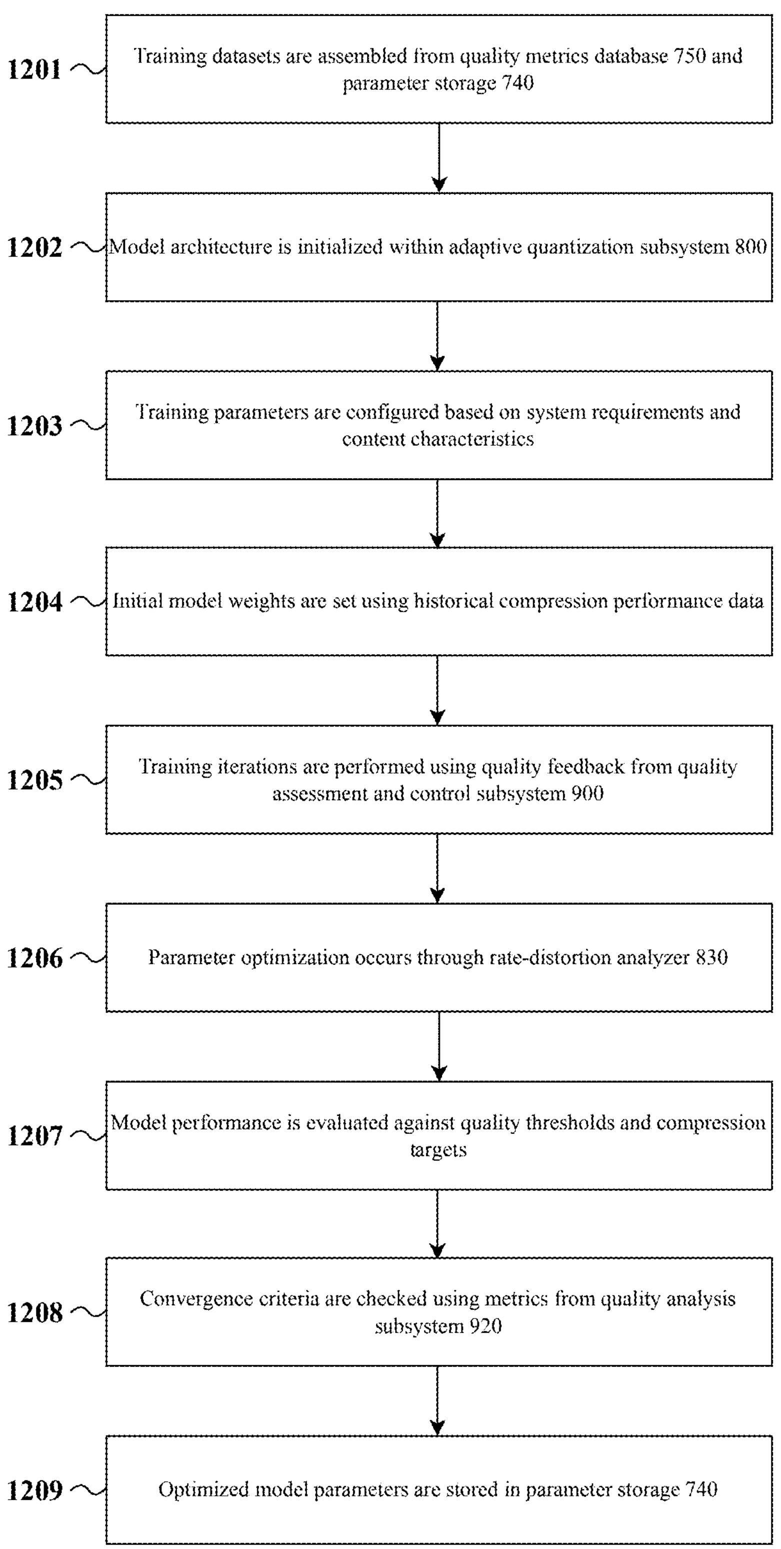
FIG. 12 is a method diagram illustrating the dynamic quantization training of quality-adaptive neural compression system.

FIG. 12 is a method diagram illustrating the dynamic quantization training of quality-adaptive neural compression system 700, in an embodiment. Training datasets are assembled from historical quality measurements stored in quality metrics database 750 and compression parameters from parameter storage 740, potentially including various content types and compression scenarios 1201. Model architecture initialization occurs within adaptive quantization subsystem 800, which may include setting up neural network layers, activation functions, and learning parameters 1202. Training parameters receive configuration based on system requirements and content characteristics, incorporating factors such as target quality levels, compression ratios, and processing constraints 1203. Initial model weights are established using historical compression performance data, which may include pre-trained parameters from similar compression tasks 1204. Training iterations execute using quality feedback signals from quality assessment and control subsystem 900, allowing the model to learn relationships between quantization parameters and compression quality 1205. Parameter optimization takes place through rate-distortion analyzer 830, employing techniques such as gradient descent or adaptive optimization algorithms 1206. Model performance undergoes evaluation against predefined quality thresholds and compression targets, measuring both objective and perceptual quality metrics 1207. Convergence criteria receive verification using metrics from quality analysis subsystem 920, ensuring the model meets stability and performance requirements 1208. Optimized model parameters flow to parameter storage 740 for deployment in the compression pipeline 1209.

In a non-limiting use case example, quality-adaptive neural compression system 700 may process video content for adaptive streaming applications. Input data 701 comprising high-resolution video frames flows into the system, where content feature extraction subsystem 810 identifies regions of varying complexity, such as high-motion areas and static backgrounds. Bit allocation engine 820 dynamically distributes available bits, potentially allocating more bits to regions with complex motion while reducing allocation for static areas. Quality assessment and control subsystem 900 continuously monitors compressed output 703, measuring factors such as PSNR, SSIM, and perceived visual quality.

During streaming, metric collection subsystem 910 may detect variations in available bandwidth through system performance indicators. Parameter adjustment subsystem 930 responds by modifying quantization parameters stored in parameter storage 740, adapting compression to maintain optimal quality within bandwidth constraints. For example, when available bandwidth decreases, feedback integration subsystem 940 may coordinate gradual parameter adjustments to reduce bitrate while preserving quality in perceptually important regions identified by content feature extraction subsystem 810.

Rate-distortion analyzer 830 continuously optimizes operating points based on current network conditions and content characteristics. If quality analysis subsystem 920 detects potential artifacts in high-motion scenes, parameter optimization subsystem 850 may adjust quantization parameters to maintain visual quality in these challenging areas. Throughout the streaming session, quality metrics database 750 accumulates performance data, enabling the system to refine its optimization strategies based on observed quality patterns and user viewing conditions.

In another non-limiting use case example, quality-adaptive neural compression system 700 may process medical imaging data from diagnostic scanning equipment. Input data 701 comprising high-resolution medical scans flows through preprocessing stages, where content feature extraction subsystem 810 identifies diagnostically significant regions such as tissue boundaries and potential anomalies. Bit allocation engine 820 implements specialized allocation strategies that maintain high fidelity in regions of diagnostic importance while achieving compression in less critical areas. Quality assessment and control subsystem 900 employs domain-specific quality metrics that may consider factors such as diagnostic visibility and feature preservation.

During operation, metric collection subsystem 910 monitors compression performance across different types of medical imagery, from X-rays to MRI scans. Parameter adjustment subsystem 930 adapts quantization parameters stored in parameter storage 740 based on specific imaging modalities and diagnostic requirements. For instance, when processing high-contrast radiological images, feedback integration subsystem 940 may fine-tune parameters to preserve subtle tissue gradients while achieving efficient compression in uniform regions identified by content feature extraction subsystem 810.

Rate-distortion analyzer 830 balances compression efficiency with diagnostic quality requirements, potentially maintaining lossless compression in critical regions while allowing controlled losses in non-diagnostic areas. Quality analysis subsystem 920 may continuously verify that compressed output 703 meets medical imaging standards and retention requirements. Throughout the process, quality metrics database 750 accumulates performance data across different imaging types and diagnostic scenarios, enabling the system to optimize compression strategies while maintaining compliance with medical imaging standards.

The use cases described above represent non-limiting examples of how quality-adaptive neural compression system 700 may be implemented. Additional applications may include satellite imagery compression where bandwidth constraints vary with orbital position, scientific data compression for large-scale physics simulations, industrial inspection systems requiring adaptive quality control, autonomous vehicle sensor data compression, real-time surveillance systems, audio compression for adaptive streaming, seismic data processing, or any other application requiring dynamic quality-driven compression. Quality assessment and control subsystem 900 may be configured to utilize domain-specific quality metrics appropriate for each application, while adaptive quantization subsystem 800 may implement content analysis strategies tailored to particular data types. The fundamental architecture of quality-adaptive neural compression system 700 enables its adaptation to various domains through appropriate configuration of quality metrics, parameter optimization strategies, and feedback control mechanisms.

Exemplary Computing Environment

Figure 13:
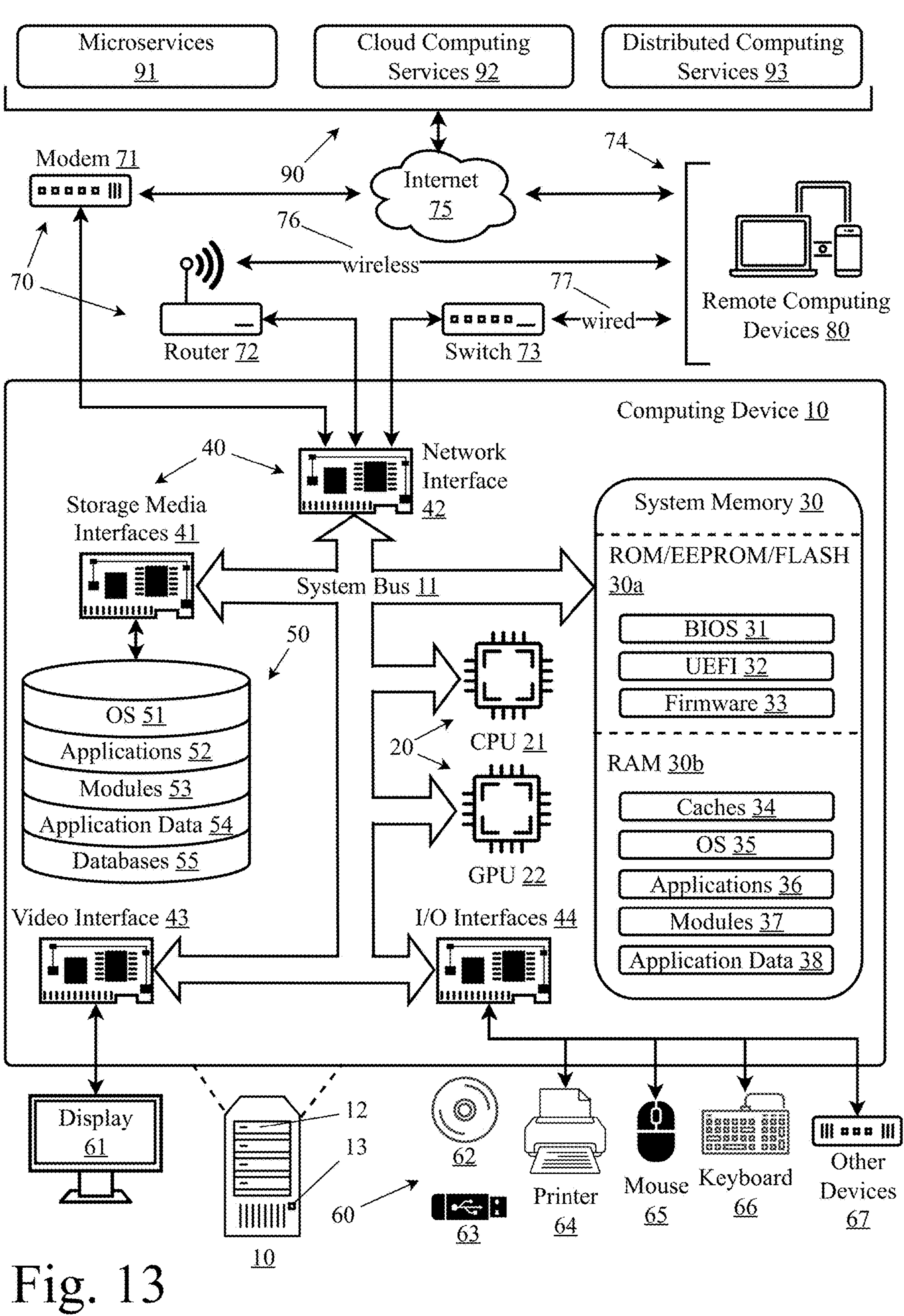
FIG. 13 illustrates an exemplary computing environment on which an embodiment described herein may be implemented, in full or in part.

FIG. 13 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory (ROM), electronically-erasable programmable memory (EEPROM), and rewritable solid-state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program subsystems 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b*** may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program subsystems 53 such as containerized programs or applications, or other modular content or modular programming, application data 54, and databases 55 such as relational databases, non-relational databases, object oriented databases, BOSQL databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that makes it possible to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containers or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, gRPC, or message queues such as Kafka. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

As can now be appreciated, disclosed embodiments provide improvements in data compression. Disclosed embodiments provide a subband learning-based compression solution for data compression, which has a divide-and-conquer strategy in dealing with redundancy in data by having a neural network encoder of latent representation, followed by a multi-stage context model that drives an arithmetic coding engine. This enables compressing of data files to reduce their file size, allowing for more efficient use of storage resources. Disclosed embodiments utilize a multiple pass compression scheme, which creates multiple latent spaces for a given input data set, creates bitstreams corresponding to each latent space, and may multiplex each bitstream into a combined bitstream for convenient storage and transmission. Compressed files created by disclosed embodiments require less bandwidth for transmission, making it faster to send and receive data over networks, including satellite links and the internet. Thus, disclosed embodiments enable data to be transmitted more efficiently, promoting important applications such as communications, multimedia streaming, reconnaissance, surveillance, meteorology, and others.

The skilled person will be aware of a range of possible modifications of the various aspects described above. Accordingly, the present invention is defined by the claims and their equivalents.

What is claimed is:

1. A computer system comprising:
- a hardware memory, wherein the computer system is configured to execute software instructions stored on nontransitory machine-readable storage media that:
  - preprocess raw data to generate input data;
  - analyze content characteristics of the input data to determine initial quantization parameters;
  - perform content-aware quantization on the input data using the determined quantization parameters;
  - perform a discrete cosine transform operation on the quantized input data to create a plurality of subbands;
  - compress the plurality of subbands using an encoder within a multi-layer autoencoder to generate compressed data;
  - perform at least one additional compression pass on the plurality of subbands using the encoder within the multi-layer autoencoder to generate at least one additional compressed bitstream, and multiplex the compressed data and the at least one additional compressed bitstream into a combined bitstream;
  - collect quality metrics from the combined bitstream, the quality metrics comprising at least a perceptual quality score and a compression measure of the compressed data;
  - store the quality metrics in a quality history database, wherein the quality history database may be accessed during a future compression of a second plurality of subbands;
  - generate parameter adjustment signals, wherein the parameter adjustment signals are based on the collected quality metrics and a quality assessment analysis;
  - modify the quantization parameters based on the parameter adjustment signals to create optimized quantization parameters for subsequent compression operations while implementing gradual parameter updates to maintain stability;
  - decompress the combined bitstream using a decoder within the multi-layer autoencoder to obtain reduced output data; and
  - process the reduced output data through a context recovery network to recover information lost in compression, thereby generating restored output data.

2. The computer system of claim 1, wherein the context recovery network comprises a first recovery stage associated with a first low frequency group, a second recovery stage associated with a second low frequency group, and a third recovery stage associated with a high frequency group.

3. The computer system of claim 2, wherein the first recovery stage, second recovery stage, and third recovery stage each implement a respective loss function optimized for data restoration.

4. The computer system of claim 1, wherein the raw data comprises IoT sensor data or hyperspectral data.

5. The computer system of claim 1, wherein analyzing the content characteristics comprises extracting perceptual feature information from the input data and determining content complexity metrics for different portions of the input data.

6. The computer system of claim 1, wherein performing the content-aware quantization comprises applying different quantization parameters to different regions of the input data based on content complexity and perceptual importance.

7. The computer system of claim 1, wherein the quality metrics comprise perceptual quality scores and compression ratios calculated for the combined bitstream, and further comprising maintaining a quality history database for parameter adjustment decisions.

8. The computer system of claim 1, wherein modifying the quantization parameters comprises implementing gradual parameter adjustments based on the quality metrics to maintain stability.

9. A method for compressing and restoring data, comprising:
- preprocessing raw data to generate input data;
- analyzing content characteristics of the input data to determine initial quantization parameters;
- performing content-aware quantization on the input data using the determined quantization parameters;
- performing a discrete cosine transform operation on the quantized input data to create a plurality of subbands;
- compressing the plurality of subbands using an encoder within a multi-layer autoencoder to generate compressed data;
- performing at least one additional compression pass on the plurality of subbands using the encoder within the multi-layer autoencoder to generate at least one additional latent space representation, and multiplexing the latent space representation and the at least one additional latent space representation into a combined bitstream;
- collecting quality metrics from the combined bitstream, the quality metrics comprising at least a perceptual quality score and a compression measure of the compressed data;
- storing the quality metrics in a quality history database, wherein the quality history database may be accessed during a future compression of a second plurality of subbands;
- generating parameter adjustment signals, wherein the parameter adjustment signals are based on the collected quality metrics and a quality assessment analysis;
- modifying the quantization parameters based on the parameter adjustment signals to create optimized quantization parameters for subsequent compression operations while implementing gradual parameter updates to maintain stability;
- decompressing the combined bitstream using a decoder within the multi-layer autoencoder to obtain reduced output data; and
- processing the reduced output data through a context recovery network to recover information lost in compression, thereby generating restored output data.

10. The method of claim 9, wherein the multi-layer autoencoder comprises a first kernel configured with five channels and a stride value of 1 that provides output to a first plurality of residual blocks, which in turn provides output to a first attention network, followed by a second plurality of residual blocks providing output to a second kernel configured with five channels and a stride value of 2, which ultimately provides output to a second attention network.

11. The method of claim 9, wherein processing the reduced output data through the context recovery network comprises implementing three loss functions respectively associated with first low frequency, second low frequency, and high frequency groups, wherein at least one of the loss functions employs a weighting scheme optimized for data restoration.

12. The method of claim 9, wherein analyzing the content characteristics comprises performing multi-scale analysis of the input data and identifying regions of varying perceptual importance.

13. The method of claim 9, wherein performing the content-aware quantization comprises distributing available bits across portions of the input data based on the analyzed content characteristics, prioritizing regions of higher perceptual importance.

14. The method of claim 9, wherein collecting the quality metrics comprises calculating perceptual quality scores and monitoring compression ratios for the combined bitstream.

15. The method of claim 9, wherein modifying the quantization parameters comprises generating parameter adjustment signals based on the collected quality metrics and implementing a predictive control algorithm.

16. The method of claim 9, wherein collecting the quality metrics occurs at multiple points during compression of the input data to enable comprehensive quality control.

* * * * *